US012346688B1

(12) United States Patent
Cheung et al.

(10) Patent No.: US 12,346,688 B1
(45) Date of Patent: Jul. 1, 2025

(54) MERGING CODE THROUGH MULTIPLE RELEASE BRANCHES

(71) Applicant: Workday, Inc., Pleasanton, CA (US)

(72) Inventors: Tom Thuan Cheung, San Jose, CA (US); Siucheong Kenny Tse, San Jose, CA (US)

(73) Assignee: Workday, Inc., Pleasanton, CA (US)

( * ) Notice: Subject to any disclaimer, the term of this patent is extended or adjusted under 35 U.S.C. 154(b) by 8 days.

(21) Appl. No.: 17/741,613

(22) Filed: May 11, 2022

(51) Int. Cl.
*G06F 8/71* (2018.01)

(52) U.S. Cl.
CPC ..................................... *G06F 8/71* (2013.01)

(58) Field of Classification Search
CPC .......................................................... G06F 8/71
See application file for complete search history.

(56) References Cited

U.S. PATENT DOCUMENTS

| | | | | |
|---|---|---|---|---|
| 8,151,244 B2* | 4/2012 | Hsu | ........................... | G06F 8/34 717/113 |
| 8,266,122 B1* | 9/2012 | Newcombe | ............. | G06F 16/80 707/705 |
| 9,128,805 B2* | 9/2015 | Michaely | ................... | G06F 8/30 |
| 9,158,658 B2* | 10/2015 | Bigwood | ............ | G06F 11/3624 |
| 9,430,229 B1* | 8/2016 | Van Zijst | ............... | G06F 9/3844 |
| 9,471,304 B1* | 10/2016 | Fuchs | ........... | G06F 8/71 |
| 9,575,764 B1* | 2/2017 | Turner | ...................... | G06F 3/14 |
| 9,760,862 B2* | 9/2017 | Bailor | .................... | G06Q 10/10 |
| 10,146,530 B1* | 12/2018 | Rajput | ...................... | G06F 8/71 |
| 10,846,210 B1* | 11/2020 | Singh | ........................ | G06F 8/71 |
| 11,119,759 B2* | 9/2021 | Samudrala | ............... | G06N 3/04 |
| 11,340,898 B1* | 5/2022 | Sabharwal | ............... | G06N 3/08 |
| 11,853,746 B2* | 12/2023 | Groenewegen | ........... | G06F 8/71 |
| 2007/0283321 A1* | 12/2007 | Hegde | ....................... | G06F 8/71 717/110 |
| 2013/0227542 A1* | 8/2013 | Pei | ........................... | G06F 8/61 717/170 |
| 2015/0106790 A1* | 4/2015 | Bigwood | ............ | G06F 11/3624 717/127 |
| 2015/0220331 A1* | 8/2015 | Bernstein | .................. | G06F 8/71 717/121 |
| 2015/0220332 A1* | 8/2015 | Bernstein | ............ | G06F 16/1873 717/121 |
| 2016/0162363 A1* | 6/2016 | Letkeman | ............. | G06F 16/178 707/641 |
| 2017/0212751 A1* | 7/2017 | Mak | ..................... | G06F 11/3616 |
| 2018/0107764 A1* | 4/2018 | Bowman | ................. | G06F 30/00 |
| 2019/0163478 A1* | 5/2019 | Cimadamore | ........ | G06F 9/3861 |
| 2019/0317754 A1* | 10/2019 | Mosquera | ............... | H04L 51/02 |
| 2019/0318366 A1* | 10/2019 | Carranza | .................. | G06N 3/08 |
| 2021/0191715 A1* | 6/2021 | Samudrala | ............. | G06N 20/00 |
| 2021/0200834 A1* | 7/2021 | Adams | .................. | G06F 16/972 |

(Continued)

*Primary Examiner* — Douglas M Slachta
(74) *Attorney, Agent, or Firm* — Van Pelt, Yi & James LLP

(57) ABSTRACT

The present application discloses a method, system, and computer system for managing versions of code. The method includes obtaining a first version of a code, determining whether the first version of the code creates a first conflict with respect to an ancestor version of the code, wherein the ancestor version of the code comprises a set of code that has a dependency relationship on another version of the code, in response to determining that the first version of the code creates the first conflict with respect to the ancestor version of the code, cause the first conflict to be resolved.

26 Claims, 13 Drawing Sheets

(56) References Cited

U.S. PATENT DOCUMENTS

| | | | |
|---|---|---|---|
| 2021/0208855 A1* | 7/2021 | Zhang | G06F 8/36 |
| 2022/0164626 A1* | 5/2022 | Bird | G06F 8/311 |
| 2022/0164672 A1* | 5/2022 | Bird | G06N 3/088 |
| 2022/0236981 A1* | 7/2022 | Liang | G06F 8/71 |
| 2023/0281005 A1* | 9/2023 | Groenewegen | G06F 11/3688 |
| | | | 717/120 |

* cited by examiner

| Version of code | Start Date | End Date | Version Prefix | Descendant (Next) Version | Ancestor (Previous) Version |
|---|---|---|---|---|---|
| BlueJays.0 | 17 Jun 2021 | 01 Sept 2021 | 10.0 | Bluejays.1 | None |
| BlueJays.1 | 04 Aug 2021 | 04 Oct 2021 | 10.1 | Bluejays.2 | Bluejays.0 |
| BlueJays.2 | 23 Sept 2021 | 28 Nov 2021 | 10.2 | Redsox.1; Dodger.1 | Bluejays.1 |
| Redsox.0 | 01 Nov 2021 | 15 Dec 2021 | 11.0 | Redsox.1 | None |
| Redsox.1 | 05 Nov 2021 | 10 Jan 2022 | 11.1 | Yankee.0 | Bluejays.2; Redsox.0 |
| Dodger.0 | 15 Nov 2021 | 15 Jan 2022 | 12.0 | Dodger.1 | None |
| Dodger.1 | 01 Dec 2021 | 31 Jan 2022 | 12.1 | None | Dodger.0 |
| Yankee.0 | 01 Dec 2021 | 15 Feb 2022 | 13.0 | None | Redsox.1 |
| ... | ... | ... | ... | ... | ... |

FIG. 3A

MERGING CODE THROUGH MULTIPLE RELEASE BRANCHES

BACKGROUND OF THE INVENTION

A system for developing code comprises a system for receiving segments of code, committing the segments of code, and making the segments of code available (e.g., to other developers or systems), etc. Aggressive (High Demand) product development cycles and timelines generally cause development of code within a single active branch difficult or infeasible. Accordingly, systems for developing code facilitate contemporaneous development of different releases of code (e.g., a version of code) by one or more developers. Various releases of code can correspond to different branches of set of code such as branches having different feature sets or that pertain development of different feature sets. This creates a problem for the different branches with corresponding code and ensuring that the different branches have appropriate versions of the corresponding code.

BRIEF DESCRIPTION OF THE DRAWINGS

Various embodiments of the invention are disclosed in the following detailed description and the accompanying drawings.

FIG. 3A is a diagram of a relational model for a set of versions of code according to various embodiments of the present application.

DETAILED DESCRIPTION

Figure 1:
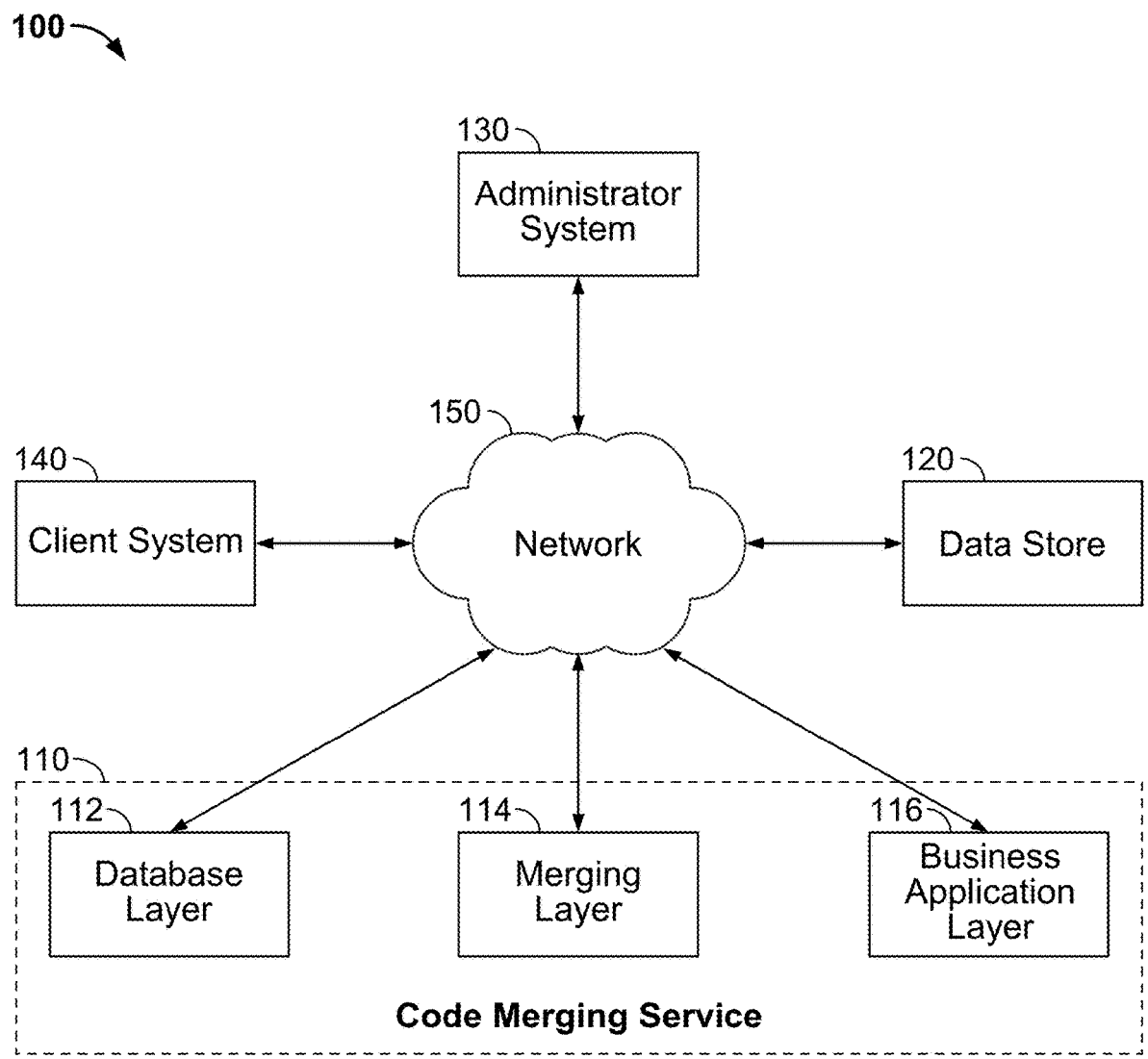
FIG. 1 is a block a diagram of a code merging system according to various embodiments of the present application.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

As used herein, a version of code is a set of code such as a branch of code, a release of code, or the like pertaining to a product or service. Two versions of code for a particular product or service may have one or more differences in one or more code segments, feature sets, etc.

As used herein, an ancestor version of code means a version of code with which a particular version of code has an interdependency. As an example, an ancestor version of code corresponding to a particular version of code is a version of code that is a parent, grandparent, other ancestor, or previous version of code for the particular version of code. As an example, the ancestor version of code may be an older version of code for the particular version of code. For example, with respect to a current version of code, the ancestor version of code may be a parent version of code relative to the current version of code (e.g., the current version of code is a child of the ancestor version of code). As another example, the with respect to a current version of code, the ancestor version of code may be a grandparent version of code relative to the current version of code (e.g., the current version of code is a grandchild of the ancestor version of code).

As used herein, a descendant version of code means a version of code with which a particular version of code has an interdependency. As an example, a descendant version of code corresponding to a particular version of code is a version of code that is a child, grandchild, other descendant, or next version of code for the particular version of code. As an example, the descendant version of code may be a newer version of code for the particular version of code. For example, with respect to a current version of code, the descendant version of code may be a child version of code relative to the particular version of code (e.g., the particular version of code is a parent of the descendant version of code). As another example, the with respect to a current version of code, the descendant version of code may be a grandchild version of code relative to the current version of code (e.g., the current version of code is a grandparent of the descendant version of code).

As used herein, a squash merge means a merge between two or more versions of code for which the changes across the two or more versions of code are committed as a single commit operation. The squash merge preserves a single record for the commit of the changes across the two or more versions of code.

As used herein, a non-squash merge means a merge between two or more versions of code for which the changes across the two or more versions of code are committed as at least a plurality of commit operations. For example, a non-squash merge preserves one or more records for each of the commits corresponding to the changes across the two or more versions of code are committed as at least a plurality of commits. As another example, a non-squash merge preserves records for at least a plurality of the commits corresponding to the changes across the two or more versions of code are committed as at least a plurality of commits.

A system and method for merging versions of code is disclosed. In some embodiments, the system obtains a first version of a code, determines whether the first version of the code creates a first conflict with respect to an ancestor version of the code, wherein the ancestor version of the code comprises a set of code that has a dependency relationship on another version of the code, and in response to determining that the first version of the code creates the first conflict with respect to the ancestor version of the code, causes the first conflict to be resolved. In some embodiments, the system commits at least part of the first version of code with respect to the ancestor version of code.

A system and method for merging versions of code is disclosed. In some embodiments, the system obtains a first version of a code, determines whether the first version of code with respect to at least one ancestor version of the code creates a set of conflicts, wherein an ancestor version of the code comprises a set of code that has a dependency on another version of code, and in response to determining that the set of conflicts is created is created, causing the set of conflicts to be resolved. In response to determining that the set of conflicts are resolved, the system creates a clone of the first version of code and merges the at least one ancestor version of the code to the clone of the first version code. The system stores a third version of code corresponding to a result of the merging of the at least one ancestor version of the code to the clone of the first version code.

According to various embodiments, the system automatically merges a version of code (e.g., a first version of code) with one or more ancestor versions of code. The first version of code may be a development branch of the code. The system may also merge the first version of code with one or more descendant versions of code. The system automatically performs the merging (e.g., of at least the version of code with the ancestor version(s) of code) in response to the first version of code being obtained. In some embodiments, the obtaining the first version of code in connection with automatically performing the merging comprises determining that a change is made to a first version of code. In some embodiments, the obtaining the version of code in connection with automatically performing the merging comprises determining that a change is made to a first version of code, and that the change is committed to the first version of code.

Related art code development systems are generally restricted to a manual merging of a version of code comprising changes to a set of code with a descendant version of code. For example, related art code development systems include a button on a user interface with which a user requests the code development system to perform a merge with a descendant version of code, such as a descendant version of code selected by the user. This is a problem though as code for descendants may not be merged so that different versions of portions of the code may exist in the code developments system. In addition, typically systems do not propagate code changes to ancestor code versions so that the advantages of any code changes are not available to ancestors. The system improves the computer by making code stored in a repository or distributed and operational better and more up-to-date. This improvement applies to ancestor and descendant related code. Stored linking of code to ancestor and descendant related code enables automatic identification of candidates for code changes as well as automatic systems for identification and automatic code change propagation.

In various embodiments, the automatic merging of the version of code with at least the ancestor version(s) of code comprises determining a set of ancestral versions of the particular version of code (e.g., the first version of code). An ancestral version of code may correspond to a predecessor to the particular version of code. As an example, the set of ancestral versions of the particular version of code comprises all ancestral versions of code for which the particular version has a dependency (e.g., an ancestor dependency or a descendant dependency that is tracked using stored metadata enabling mapping between versions of code). As another example, the set of ancestral versions of the particular version of code comprises a version levels threshold (e.g., an ancestral level threshold), or the set of ancestral versions of code is limited to the version levels threshold (e.g., the set of ancestral versions includes all ancestral versions of code up to a version levels threshold). In some embodiments, in the case that a particular version of code has a number of ancestral versions that exceeds the version levels threshold number, the set of ancestral versions is limited (e.g., determined) based on a level of ancestor relative to the particular version of code (e.g., an extent to which the particular version of code has a direct dependency to the ancestral versions). For example, parent versions of code are included first, then grandparent versions of code, then great-grandparent versions of code, etc. In some embodiments, the version levels threshold is configurable, such as by an administrator (e.g., an administrator of an organization for which the code is being developed, such as a customer of the code development/code merging service, etc.). In some implementations, the version levels threshold is 2. In some implementations, the version levels threshold is 3. Various other positive integers may be used as the version levels threshold. The number of threshold number of ancestral versions for which mergeability is ensured may be set based on a balancing of the benefits associated with ensuring mergeability across a greater number of versions of code, with the practicality associated with checking mergeability and resolving conflicts to ensure such mergeability across the number of versions of code.

In various embodiments, the automatic merging (or ensuring mergeability) of the version of code with at least the descendant version(s) of code comprises determining a set of descendant versions of the particular version of code (e.g., the first version of code). A descendant version of code may correspond to a successor to the particular version of code. As an example, the set of descendent versions of the particular version of code comprises all descendant versions of code for which the particular version has a dependency (e.g., a child, a grandchild, a great-grandchild, etc.). As another example, the set of descendant versions of the particular version of code comprises a version levels threshold (e.g., a descendant level threshold), or the set of descendant versions of code is limited to the version levels threshold (e.g., the set of ancestral versions includes all ancestral versions of code up to a version levels threshold). In some embodiments, in the case that a particular version of code has a number of descendant versions that exceeds the version levels threshold, the set of descendant versions is limited (e.g., determined) based on a level of descendants relative to the particular version of code (e.g., an extent to which the particular version of code has a direct dependency to the descendant versions). For example, child versions of code are included first, then grandchildren versions of code, then great-grandchildren versions of code, etc. In some embodiments, the version levels threshold is configurable, such as by an administrator (e.g., an administrator of an organization for which the code is being developed, such as a customer of the code development/code merging service, etc.). In some implementations, the version levels threshold is 2. In some implementations, the version levels threshold is 3. Various other positive integers may be used as the version levels threshold. The number of threshold number of descendant versions for which mergeability is ensured may be set based on a balancing of the benefits associated with ensuring mergeability across a greater number of versions of code, with the practicality associated with checking mergeability and resolving conflicts to ensure such mergeability across the number of versions of code. In some embodiments, the system implements the version levels threshold with respect to ensuring mergeability with ancestors of a particular version of code and the system does not implement the version levels threshold with respect to ensuring mergeability with descendants of the particular version of code (e.g., the changes in the particular version of code are merged with all descendants).

The descendant level threshold may be equal to the ancestral level threshold, or the descendant level threshold and the ancestral level threshold may be different (e.g., the descendant level threshold and the ancestral level threshold may be separately configurable). In some embodiments, the system enforces/ensure mergeability and/or merges a particular version of code with N ancestors, and M descendants, where N and M are respectively positive integers (which may be the same or different).

In various embodiments, the system determines one or more ancestor versions of code and/or one or more descendant versions of code corresponding to a particular version of code based on a mapping of versions of code and corresponding ancestor versions and/or descendant versions. For example, the system stores information (e.g., metadata) pertaining to a particular version of code, including one or more of a version name, a version number, a date of release/implementation, a last modified date, an expiration date (e.g., a date when the release is no longer valid/approved, a date when the release was replaced by another release, etc.), an ancestor version(s) (e.g., version(s) from which the particular version of code is branched, etc., if any), a descendant version(s) (e.g., version(s) that are created as branches to the particular version of code, etc., if any), etc. In various embodiments, the system determines one or more ancestor versions of code and/or one or more descendant versions of code corresponding to a particular version of code in response to determining that the particular version of code is to be committed (e.g., in response to receiving an instruction to store the particular version of code or to store/commit the changes in the particular version of code). As an example, in response to determining that the particular version of code is to be committed, the system obtains the information corresponding to the particular version of code (e.g., queries a mapping of versions of code to ancestor and/or descendant versions of code) in connection with determining the one or more ancestor versions of code and/or one or more descendant versions of code. In various embodiments, at least one ancestor version of code associated with the particular version of code (e.g., the first version of code) is determined and merged with the particular version of code upon resolution of any mergeability conflicts.

In some embodiments, the mapping of versions of code and corresponding ancestor versions and/or descendant versions (or the information stored in association with a particular version of code including, for example, corresponding ancestor versions and/or descendant versions, etc.) is dynamically updated. For example, the mapping of versions of code and corresponding ancestor versions and/or descendant versions is updated in real-time. As a new branch (e.g., version of code) is created, the mapping is updated to include the new branch and an indication of the dependency for the branch (e.g., any ancestor versions of code for which a dependency exists), etc. As another example, when a release changes a mapping of ancestor/descendant versions of code, the system automatically updates the mapping of versions of code and corresponding ancestor versions and/or descendant versions (or such other data structure storing such associations or dependencies).

In response to determining to merge two versions of code, systems for managing development of code and/or merging branches of code generally determine a set of conflicts (e.g., merge conflicts) that may arise upon merging of the two versions of code. Failure to check the conflicts before performing the merge of the two versions of code may result in errors in the code (e.g., runtime errors, documentation errors, etc.). For example, a name of a function may differ across the two versions of code. As another example, a location of a library being called may differ across the two versions of code. As another example, if a certain release of code has deleted a feature, but a later version of code corresponding to a branch of an earlier release still has the feature, a conflict may exist with respect to the feature. To ensure a streamlined (e.g., quick, efficient, conflict-free) release incorporating different features developed across different branches of code, in various embodiments the system determines whether any conflicts exist between the different branches of code (e.g., the two versions of code). Further, in various embodiments, the system may automatically resolve any conflicts (or a first subset of any such conflicts) and/or automatically cause any such conflicts to be resolved (or a second subset of any such conflicts).

According to various embodiments, the system enforces mergeability across a plurality of versions of code. In response to determining that a version of code is being committed (e.g., that changes to code are being committed), the system automatically enforces mergeability across the plurality of versions of code. The plurality of versions of code may be determined based at least in part on a dependency relationship across different versions of code. For example, the system determines the plurality of versions of code based at least in part on information corresponding to the particular version of code (e.g., a mapping of versions of code to ancestor and/or descendant versions of code). In some embodiments, the system does not automatically merge or the system does not merge the plurality of versions of code upon committing the version of code, but the system automatically (e.g., in response to determining that the version of code is to be committed) ensures that the plurality of versions of code are mergeable. For example, the system maintains the plurality of versions of code in respective states that permit the plurality of versions of code to be merged in a conflict-free manner upon a determination to merge the plurality of versions of code.

Enforcing mergeability across a plurality of versions of code includes checking for conflicts (e.g., merge conflicts, inconsistencies in features, functions, libraries, etc.) with respect to the plurality of versions of code (e.g., a particular version of code and an ancestor version of code and/or a descendant version of code, etc.), and causing any detected conflicts to be resolved (e.g., the system automatically resolves the conflicts or creates a task for a user to manually resolve the conflict). For example, the versions of code have been resolved to a point that the versions of code are always mergeable (e.g., until a change to a version of code is made and mergeability is checked and ensured again). Enforcing mergeability across a plurality of versions of code allow for cross-version updating to the code and/or cross-version merging. For example, the enforcing mergeability across a plurality of versions facilitates a more efficient and conflict-free update/development of parallel branches of code. In addition, automatic enforcing of mergeability across the plurality of versions facilitates the propagation of code across versions (e.g., branches) without the developer needing to take action (e.g., except to the extent that a conflict is detected, and the system determines that manual resolution of the conflict is necessary). For example, a change to a particular version of code may be propagated to N ancestor versions of code and/or M descendant versions of code, where N and M are respectively positive integers (which may be the same or different).

In various embodiments, the system merges a version of code with one or more ancestor versions of code (e.g., N ancestor versions of code) and/or one or more descendant versions of code (e.g., M descendant versions of code), or otherwise ensures/enforces mergeability between the version of code (e.g., the first version of code) and the ancestor version(s) of code and/or descendant version(s) of code based at least in part on a set of versions and/or changes to code that are to be excluded. In some embodiments, the system stores an exclusion list, or an exclusion mapping of versions or changes to indications of whether conflicts are to be excluded from a pre-condition of conflict resolution before merging (or an exclusion of a type of conflicts to an indications of whether conflicts are to be excluded from a pre-condition of conflict resolution before merging), and the system uses the exclusion list or exclusion mapping in connection with merging the version of code and/or enforcing mergeability. As an example, the system stores a list of versions of code for which the system is to merge with the ancestor version(s) of code and/or descendant version(s) of code regardless of whether mergeability conflicts exist (e.g., versions of code for which the system is to bypass a check of mergeability or whether conflicts exist) and commits the version of code if the version of code is included in the exclusion list. As another example, the system stores a list of changes for which the system is to merge with other versions of code (e.g., commit) regardless of whether a mergeability conflict exists (e.g., changes for which the system is to bypass a check of mergeability or whether conflicts exist). As another example, the system stores a list of types of changes for which the system is to merge with other versions of code (e.g., commit) regardless of whether a mergeability conflict exists. In some embodiments, the list of types changes for which the system is to bypass a check of mergeability or whether conflicts exist. In some embodiments, the exclusion list is configurable, such as by an administrator of the organization for which the code is being merged/developed (e.g., a customer of the code development/merging service).

According to various embodiments, the system enforces mergeability or merges versions of code based at least in part on the exclusion list. In response to determining that a version of code is obtained, or that a set of changes to a version of code are to be committed, the system: (i) determines the ancestor version(s) of code and/or the descendant version(s) of code with which the version of code is to be merged or for which mergeability is to be enforced, (ii) the set of changes associated with the version of code relative to the ancestor version(s) of code and/or the descendant version(s) of code, (iii) obtain the exclusion list, (iv) determine a first subset of changes of the set of changes that are to be excluded from merging/enforcement of mergeability based at least in part on the exclusion list (e.g., the system determines the subset of the set of changes that are included in the exclusion list), (v) determine a second subset of changes of the set of changes for which mergeability is to be determined/resolved based at least in part on the first subset of changes, (vi) determine a set of conflicts between the second subset of changes and the ancestor version(s) of code and/or the descendant version(s) of code, and/or (v) cause the set of conflicts to be resolved. In some embodiments, the exclusion list comprises a set of files that are not checked with respect to mergeability before the files (e.g., code) are committed. As an example, the set of files or changes on the exclusion list correspond to files or changes for which a user (e.g., a developer, etc.) or organization is to ensure is correct (e.g., without conflicts) when committed. The system uses the exclusion list as a filter for identifying the conflicts for which the system is to ensure/enforce mergeability.

In various embodiments, in response to determining that merging a version of code (e.g., the first version of code) with ancestor version(s) of code and/or the descendant version(s) of code creates a conflict, the system causes the conflict to be resolved. In some embodiments, the system causing the conflict to be resolved includes determining a resolution to the conflict (e.g., one or more operations to perform to mitigate the conflict), such as a change to perform relative to the ancestor version(s) of code and/or the descendant version(s) of code to enable the changes of the version of code to be mergeable. In response to determining the resolution to the conflict, the system performs the resolution (e.g., the one or more operations). The system may automatically perform the resolution or prompt a user to confirm the resolution before performing the resolution. For example, the system may automatically perform certain types of conflicts, and provide a recommendation (or request confirmation) to a user with respect to certain other types of conflicts. In some embodiments, the system stores a mapping of conflicts (e.g., conflicts, types of conflicts, types of resolution operations, etc.) to an indication of whether the system is to automatically resolve the conflict or to prompt a user for confirmation/acceptance, and in response to the system determining a resolution, the system checks the mapping to determine whether to automatically resolve the conflict or to prompt a user for confirmation/acceptance.

In various embodiments, the system uses determines, based at least in part on a historical information pertaining to past conflicts and/or past resolutions, a resolution to an identified conflict, such as one or more operations to perform to mitigate the conflict (e.g., a change to perform relative to the ancestor version(s) of code and/or the descendant version(s) of code to enable the changes of the version of code to be mergeable). The historical information pertaining to past conflicts and/or past resolutions may include a mapping of conflicts (or types of conflicts) to resolutions (e.g., one or more operations), such as resolutions performed to resolve the conflict (e.g., ensure mergeability) in the past. The historical information may pertain to previous versions of the same set of code, to similar types of code, or to various types of code (e.g., various versions of the various types of code), or all sets of code that have been managed or stored with respect to the system. In some embodiments, a machine learning model is generated to predict/determine an expected resolution, and the system implements the expected resolution (or prompts a user to confirm the expected resolution). The machine learning model may be generated based at least in part on the historical information. Examples of machine learning processes that can be implemented in connection with training a machine learning model for determining a prediction or estimate of an expected resolution include random forest, linear regression, support vector machine, naive Bayes, logistic regression, K-nearest neighbors, decision trees, gradient boosted decision trees, K-means clustering, hierarchical clustering, density-based spatial clustering of applications with noise (DB-SCAN) clustering, principal component analysis, etc.

In various embodiments, the system performs a mergeability check (e.g., enforces mergeability) according to a predetermined schedule/frequency, or in response to one or more criteria being satisfied. Examples of a predetermined schedule or frequency is daily (e.g., during off-peak hours), weekly, monthly, etc. Examples of the one or more criteria include (i) a threshold number of changes having been made to a particular version of code, (ii) a degree/extent of a difference between a particular version of code and a predetermined baseline or reference version of code, (iii) receipt of an indication that a version of code is to be committed such as an instruction from a user, (iv) receipt of an indication that a particular change to the version of code is to be committed, (v) receipt to of an indication that a particular version of code is to be pushed as a release, and/or (vi) receipt of a request to enforce/ensure mergeability with another version of code such as a particular other version of code, or an ancestor version(s) and/or descendant version(s) of code determined according to a predetermined rule set or policy (e.g., a policy indicating a number of ancestors or descendants with which to enforce mergeability), etc.

In some embodiments, in connection with merging a version of code with another version of code (e.g., an ancestor version(s) of code and/or the descendant version(s) of code), the system determines a type of merge to perform. For example, the system determines whether to perform a squash merge or a non-squash merge. In some embodiments, the primary decision criteria for performing a squash merge or a non-squash merge is whether the merge is an initial code change or the code change is from another code version. If from another code version, the system may select a non-squash merge type to ensure future mergeability checks have the commit history to enable more efficient processing. Otherwise, additional conflict resolution may be required the next time. For an initial code change, it is dependent on the intent but desired commit history result, but usually should be squash merge to streamline the commit history.

In response to determining the type of merge, the system may provide a prompt to a user to confirm the type of merge. Alternatively, in response to determining the type of merge, the system merges the version of code with the other version(s) of code based at least in part on the type of merge. Every change corresponds to a new commit. For example, a change to code corresponds to a new commit. As another example, a change to resolve a conflict is a new commit. In some embodiments, the system determines the type of merge based at least in part on an indication from a user (e.g., an administrator), such as an indication provided in connection with a request/indication for the version of code to be committed. In some embodiments, the system determines the type of merge based at least in part on a number of changes or extent of modifications made to the version of code to be merges. In some embodiments, the system determines the type of merge based at least in part on whether a version of code to be merged comprises a particular type of change. Determination of a type of merge to be performed may be based at least in part on one or more of (or any combination thereof): (i) an indication provided by a system or user requesting the merge, (ii) an indication that the version of code is being committed in connection with pushing a release, (iii) a determination that a number of changes to be committed exceed a threshold number of changes, (iv) a determination that the set of changes to be committed include a particular type(s) of change, (v) a type of change, (vi) an indication that a user desires to maintain record of the commit for a particular set of one or more changes, etc. Various other factors may be used in connection with determining a type of merge to be performed.

In response to determining to merge the version of code with another version of code (e.g., an ancestor and/or descendant version of code), the system performs the merge. In various embodiments, the system performs a reverse merge in connection with merging the version of code. A reverse merge reduces or eliminates the risk that an error or failure is caused to a live release of code. For example, it may be undesirable to make changes corresponding to a merge of the version of code (e.g., the first version of code) to the specific version of code that is being run live (e.g., a live version of code). According to various embodiments, performing a reverse merge comprises cloning (e.g., creating a copy) of the version of code for which changes are to be committed (e.g., merged with respect to other versions of code), and merging the other versions of code (e.g., the ancestor version(s) of code and/or descendant version(s) of code) to the clone version of code. As an example, in the case of merging a first version of code to a release version of code, the system clones the first version of code, and merges the release version of code to the clone of the first version of code to obtain a new release version of code. Merging the release version of code to the clone of the first version of code includes determining a difference between the release version of code and the clone of the first version of code and committing changes to the clone of the first version of code. The system may perform a reverse merge with respect to all merging operations (e.g., in connection with merging the first version with any other version of code), or with respect to a subset of the merging operations (e.g., in connection with performing a merge with respect to a subset of the other versions of code).

In some embodiments, the system performs a reverse merge to merge a first version of code to a descendant version of code in response to a determination that a mergeability conflict exists between the first version of code and the descendant version of code. In some embodiments, the system performs a reverse merge with respect to merging a first version code with any descendant version of code.

In some embodiments, the system performs a forward merge to merge a first version of code to an ancestor version of code. The performing the forward merge includes determining a difference between the ancestor version of code and the first version of code and committing changes to the ancestor version of code to reflect the difference between the ancestor version of code and the first version of code. In some embodiments, the ancestor is able to absorb a first version of code and resolving differences both ways.

Various embodiments improve the management of versions of code to ensure mergeability across a plurality of versions of code comprising at least one dependency. The Various embodiments ensure mergeability during the development cycles for the plurality of versions of code to facilitate a quicker propagation of code for a release (e.g., a version of code for a product release). For example, various embodiments automatically enforce mergeability across the plurality of versions of code as changes are made to at least a subset of the plurality of versions of code. Accordingly, in some embodiments, the plurality of versions of code are maintained in a state in which the versions of code are mergeable (e.g., seamlessly mergeable) upon a determination or request to push a release.

FIG. 1 is a block a diagram of a code merging system according to various embodiments of the present application.

In the example illustrated in FIG. 1, system 100 includes code merging service 110, data store 120, administrator system 130, and/or client system 140. In some embodiments, code merging service 110 and data store 120, are integrated (e.g., combined into a layer or a single set of servers). In some embodiments, code merging service 110 comprises database layer 112, merging layer 114, and/or business application layer 116. System 100 further includes one or more networks such as network 150 over which administrator system 130 and/or client system 140 communicates with code merging service 110, and/or data store 120. In various embodiments, network 150 includes one or more of a wired network, and/or a wireless network such as a cellular network, a wireless local area network (WLAN), or any other appropriate network. In some embodiments, database layer 112, merging layer 114, and/or business application layer 116 are respectively implemented by one or more servers. System 100 may include various other systems or terminals.

The code merging service may be deployed in connection with a system (or service) that manages development of code such as a system that stores versions of code and/or receives versions of code or changes of code from a user (e.g., a user associated with an organization that is a customer of the system/service).

Code merging service 110 manages the merging of different versions of code. In some embodiments, code merging service 110 receives a version of code, determines a set of conflicts (e.g., mergeability conflicts) that exist (if any) to ensure mergeability with other versions of code, and causes the set of conflicts to be resolved. Code merging service 110 may cause the set of conflicts to be resolved in connecting with performing a merging operation of the version of code with the applicable other version of code. Alternatively, code merging service 110 may cause the set of conflicts to be resolved in connection with ensuring mergeability of the version of code with the applicable other version of code. In some embodiments, ensuring mergeability includes ensuring that the version of code to be merged (e.g., a first version of code for which changes are to be committed) and/or the applicable other version of code (e.g., an ancestor version of code or descendant version of code) are maintained in a state in which the versions of code can be merged without invoking a conflict when the system receives a request (or otherwise determines) to merge the versions of code. Maintaining versions of code in a state in which the versions of code are mergeable (e.g., do not invoke a conflict when merged) allows for releases to be more efficiently and/or quickly pushed. In addition, enforcement of mergeability across versions allows for different branches of code to be more seamlessly developed in parallel.

According to various embodiments, code merging service 110 comprises database layer 112, merging layer 114, and/or business application layer 116.

Code merging service 110 uses database layer 112 to store one or more versions of code, and relational information (e.g., dependency relationships) among versions of code such as a mapping of mapping of versions of code and corresponding ancestor versions and/or descendant versions. Code merging service 110 may further use database layer 112 to store one or more of an exclusion list, metadata associated with one or more versions of code, historical information pertaining to versions of code or pertaining to a manner by which previous conflicts were resolved (e.g., a log or mapping of one or more operations performed to resolve a corresponding conflict), a machine learning model for determining a prediction or estimate of an expected resolution, etc. Database layer 112 services queries or writes (or other commands) received in connection with development of one or more versions of code or merging a version of code with one or more other versions of code (e.g., ancestor and/or descendant versions of code) such as by an application running on business application layer 116.

Code merging service 110 uses merging layer 114 to merge versions of code such as to merge a first version of code with one or more other versions of code (e.g., an ancestor version(s) of code and/or a descendant version(s) of code). Merging layer 114 determines a set of conflicts (e.g., mergeability conflicts) that are expected (e.g., would be created) by merging the first version of code with the one or more other versions of code, and causes the set of conflicts to be resolved.

In various embodiments, code merging service 110 uses merging layer 114 in connection with enforcing, or otherwise ensuring, mergeability across various versions of code. For example, merging layer 114 enforces mergeability across the various versions of code based at least in part on performing a mergeability check according to a predetermined schedule/frequency, or in response to one or more criteria being satisfied. Examples of a predetermined schedule or frequency is daily (e.g., during off-peak hours), weekly, monthly, etc. Examples of the one or more criteria include (i) a threshold number of changes having been made to a particular version of code, (ii) a degree/extent of a difference between a particular version of code and a predetermined baseline or reference version of code, (iii) receipt of an indication that a version of code is to be committed such as an instruction from a user, (iv) receipt of an indication that a particular change to the version of code is to be committed, (v) receipt to of an indication that a particular version of code is to be pushed as a release, and/or (vi) receipt of a request to enforce/ensure mergeability with another version of code such as a particular other version of code, or an ancestor version(s) and/or descendant version(s) of code determined according to a predetermined rule set or policy (e.g., a policy indicating a number of ancestors or descendants with which to enforce mergeability), etc.

According to various embodiments, in connection with enforcing mergeability across various versions of code, merging layer 114 performs a mergeability check to determine a set of conflicts (if any) that are expected to arise if the first version of code is merged with the one or more other versions of code. In response to determining the set of conflicts, merging layer 114 causes the set of conflicts to be resolved. For example, merging layer 114 causes one or more operations to be performed with respect to the one or more other versions of code or the first version of code to obtain a state in which no conflicts are expected to arise when the first version is merged with the one or more other versions of code.

In various embodiments, in response to determining that merging the first version of code the one or more other versions is expected to create a set of conflicts, merging layer 114 causes the conflict to be resolved. Merging layer 114 may automatically determine and/or perform the resolution or use an application running on business application layer 116 to prompt a user (e.g., a user of administrator system 130 or client system 140) to confirm the resolution before performing the resolution. In some embodiments, merging layer 114 automatically perform certain types of conflicts, and provides a recommendation (or request confirmation) to a user with respect to certain other types of conflicts. Database layer 112 can store a mapping of conflicts (e.g., conflicts, types of conflicts, types of resolution operations, etc.) to an indication of whether the system is to automatically resolve the conflict or to prompt a user for confirmation/acceptance, and in response to the system determining a resolution, and merging layer 114 queries the mapping to determine whether to automatically resolve the conflict or to prompt a user for confirmation/acceptance. In some embodiments, in response to determining that merging the first version of code the one or more other versions is expected to create a set of conflicts, merging layer 114 prompts a user to manually resolve the conflict. For example, merging layer 114 creates a task for a user to manually resolve the conflict, and code merging service 110 uses an application running on business application layer 116 to communicate the task (or an indication of the task) to a user (e.g., a user of administrator system 130 or client system 140). The application running on business application layer 116 can configure a user interface with the indication of the task and provide the user interface to the user such as via an application running on administrator system 130 or client system 140, or via a web interface.

In connection with enforcing/ensuring mergeability of the first version of code, merging layer 114 determines a set of ancestor versions of code and/or descendant versions of code with which to enforce/ensure mergeability. Database layer 112 can store relational information such as dependency information among various versions of code. For example, the database layer 112 stores information (e.g., metadata) pertaining to a particular version of code, including one or more of a version name, a version number, a date of release/implementation, a last modified date, an expiration date (e.g., a date when the release is no longer valid/approved, a date when the release was replaced by another release, etc.), an ancestor version(s) (e.g., version(s) from which the particular version of code is branched, etc., if any), a descendant version(s) (e.g., version(s) that are created as branches to the particular version of code, etc., if any), etc. Database layer 112 can further store a mapping of versions of code and corresponding ancestor versions and/or descendant versions (or the information stored in association with a particular version of code including, for example, corresponding ancestor versions and/or descendant versions, etc.). As an example, the mapping of versions of code is dynamically updated based on the modification of versions of code, or the creation of new versions of code such as a new branch being created with respect to a particular version of code. Merging layer 114 queries the mapping of versions of code and corresponding ancestor versions and/or descendant versions to determine the set of versions of code (e.g., ancestor and/or descendant versions of code) with which mergeability of the first version of code is to be determined and enforced. As an example, in response to determining that the particular version of code is to be committed, the system obtains the information corresponding to the particular version of code (e.g., queries a mapping of versions of code to ancestor and/or descendant versions of code) in connection with determining the one or more ancestor versions of code and/or one or more descendant versions of code. In various embodiments, at least one ancestor version of code associated with the particular version of code (e.g., the first version of code) is determined and merged with the particular version of code upon resolution of any mergeability conflicts.

In various embodiments, merging layer 114 automatically merges or enforces mergeability in response to determining that a version of code (e.g., the first version of code) is to be committed (e.g., that changes made to the first version of code are to be committed), or in accordance with a predetermined schedule or frequency, or satisfaction of one or more predefined criteria. The automatic merging (or ensuring mergeability) of the version of code includes determining the one or more ancestor versions of code (e.g., a set of ancestor versions of code) and/or one or more descendant versions of code (e.g., a set of descendant versions of code) with which the first version of code is to be mergeable. In some embodiments, merging layer 114 uses a version levels threshold (e.g., a predefined descendant level threshold and/or predefined ancestor level threshold) to determine the one or more ancestor versions of code and/or one or more descendant versions of code. The descendant level threshold may be equal to the ancestral level threshold, or the descendant level threshold and the ancestral level threshold may be different (e.g., the descendant level threshold and the ancestral level threshold may be separately configurable). In some embodiments, the system enforces/ensure mergeability and/or merges a particular version of code with N ancestors, and M descendants, where N and M are respectively positive integers (which may be the same or different). As an example, a user such as a developer or administrator of first version of code can configure the version levels threshold via an interface provided/configured by business application layer 116 to administrator system 130 or client system 140.

In the case that the first version of code has a number of descendant versions that exceeds the version levels threshold, merging layer 114 limits the set of descendant versions (e.g., determined) based on a level of descendants relative to the particular version of code (e.g., an extent to which the particular version of code has a direct dependency to the descendant versions), such as based on the predefined descendant level threshold. For example, child versions of code are included first, then grandchildren versions of code, then great-grandchildren versions of code, etc. In some embodiments, the version levels threshold is configurable, such as by an administrator (e.g., an administrator of an organization for which the code is being developed, such as a customer of the code development/code merging service, etc.). In some implementations, the version levels threshold is 2. In some implementations, the version levels threshold is 3. Various other positive integers may be used as the version levels threshold. The number of threshold number of descendant versions for which mergeability is ensured may be set based on a balancing of the benefits associated with ensuring mergeability across a greater number of versions of code, with the practicality associated with checking mergeability and resolving conflicts to ensure such mergeability across the number of versions of code.

In some embodiments, merging layer 114 obtains the version levels threshold from database layer 112 and implements the version levels threshold with respect to ensuring mergeability with ancestors of the first version of code (e.g., a set of ancestor versions of code) and database layer 112 does not implement the version levels threshold with respect to ensuring mergeability with descendants of the particular version of code (e.g., the changes in the particular version of code is merged with all descendants).

According to various embodiments, code merging service 110 (e.g., merging layer 114) enforces mergeability across a plurality of versions of code. In response to determining that a first version of code is being committed (e.g., that changes to code are being committed), merging layer 114 automatically enforces mergeability across the plurality of versions of code. Merging layer 114 determines the plurality of versions of code based at least in part on a dependency relationship across different versions of code. For example, merging layer 114 determines the plurality of versions of code based at least in part on information corresponding to the particular version of code (e.g., a mapping of versions of code to ancestor and/or descendant versions of code). In some embodiments, merging layer 114 does not automatically merge the plurality of versions of code upon committing the version of code; rather, merging layer 114 automatically (e.g., in response to determining that the version of code is to be committed) ensures that the plurality of versions of code are mergeable (e.g., merging layer 114 enforces code merging service 110 to store the plurality of versions of code in corresponding states in which the plurality of versions of code are mergeable upon a request or determination to perform the merging. For example, code merging service 110 maintains the plurality of versions of code in respective states that permit the plurality of versions of code to be merged in a conflict-free manner upon a determination to merge the plurality of versions of code.

Enforcing mergeability across a plurality of versions of code includes checking for conflicts (e.g., merge conflicts, inconsistencies in features, functions, libraries, etc.) with respect to the plurality of versions of code (e.g., a particular version of code and an ancestor version of code and/or a descendant version of code, etc.), and causing any detected conflicts to be resolved (e.g., the system automatically resolves the conflicts or creates a task for a user to manually resolve the conflict). For example, the versions of code have been resolved to a point that the versions of code are always mergeable (e.g., until a change to a version of code is made and mergeability is checked and ensured again). Enforcing mergeability across a plurality of versions of code allow for cross-version updating to the code and/or cross-version merging. For example, the enforcing mergeability across a plurality of versions facilitates a more efficient and conflict-free update/development of parallel branches of code. In addition, automatic enforcing of mergeability across the plurality of versions facilitates the propagation of code across versions (e.g., branches) without the developer needing to take action (e.g., except to the extent that a conflict is detected, and the system determines that manual resolution of the conflict is necessary). For example, a change to a particular version of code may be propagated to N ancestor versions of code and/or M descendant versions of code, where N and M are respectively positive integers (which may be the same or different).

In various embodiments, merging layer 114 merges a version of code with one or more ancestor versions of code (e.g., N ancestor versions of code) and/or one or more descendant versions of code (e.g., M descendant versions of code), or otherwise ensures/enforces mergeability between the version of code (e.g., the first version of code) and the ancestor version(s) of code and/or descendant version(s) of code based at least in part on a set of versions and/or changes to code that are to be excluded. In some embodiments, code merging service 110 uses database layer 112 to store an exclusion list, or an exclusion mapping of versions or changes to indications of whether conflicts are to be excluded from a pre-condition of conflict resolution before merging (or an exclusion of a type of conflicts to an indications of whether conflicts are to be excluded from a pre-condition of conflict resolution before merging), and merging layer 114 uses the exclusion list or exclusion mapping in connection with merging the version of code and/or enforcing mergeability.

Merging layer 114 can query the database layer 112 to determine whether a conflict or version of code is on the exclusion list. As an example, code merging service 110 stores a list of versions of code for which the system is to merge with the ancestor version(s) of code and/or descendant version(s) of code regardless of whether mergeability conflicts exist (e.g., versions of code for which the system is to bypass a check of mergeability or whether conflicts exist), and uses merging layer 114 to commit the version of code if the version of code is included in the exclusion list. As another example, code merging service 110 stores a list of changes for which the system is to merge with other versions of code (e.g., commit) regardless of whether a mergeability conflict exists (e.g., changes for which the system is to bypass a check of mergeability or whether conflicts exist). As another example, code merging service 110 stores a list of types of changes for which the system is to merge with other versions of code (e.g., commit) regardless of whether a mergeability conflict exists. In some embodiments, the list of types changes for which the system is to bypass a check of mergeability or whether conflicts exist. In some embodiments, the exclusion list is configurable, such as by an administrator of the organization for which the code is being merged/developed via administrator system 130, or by a developer of the code via client system 140.

According to various embodiments, the system enforces mergeability or merges versions of code based at least in part on the exclusion list. In response to determining that a version of code is obtained, or that a set of changes to a version of code are to be committed, the system: (i) determines the ancestor version(s) of code and/or the descendant version(s) of code with which the version of code is to be merged or for which mergeability is to be enforced, (ii) the set of changes associated with the version of code relative to the ancestor version(s) of code and/or the descendant version(s) of code, (iii) obtain the exclusion list, (iv) determine a first subset of changes of the set of changes that are to be excluded from merging/enforcement of mergeability based at least in part on the exclusion list (e.g., the system determines the subset of the set of changes that are included in the exclusion list), (v) determine a second subset of changes of the set of changes for which mergeability is to be determined/resolved based at least in part on the first subset of changes, (vi) determine a set of conflicts between the second subset of changes and the ancestor version(s) of code and/or the descendant version(s) of code, and/or (v) cause the set of conflicts to be resolved. In some embodiments, the exclusion list comprises a set of files that are not checked with respect to mergeability before the files (e.g., code) are committed. As an example, the set of files or changes on the exclusion list correspond to files or changes for which a user (e.g., a developer, etc.) or organization is to ensure is correct (e.g., without conflicts) when committed. The system uses the exclusion list as a filter for identifying the conflicts for which the system is to ensure/enforce mergeability.

In various embodiments, in response to determining that merging the first version of code with ancestor version(s) of code and/or the descendant version(s) of code creates a conflict, code merging service 110 (e.g., merging layer 114) causes the conflict to be resolved. Code merging service causes the conflict to be resolved by determining a resolution to the conflict (e.g., one or more operations to perform to mitigate the conflict), such as a change to perform relative to the ancestor version(s) of code and/or the descendant version(s) of code to enable the changes of the version of code to be mergeable. In response to determining the resolution to the conflict, merging layer 114 performs the resolution (e.g., the one or more operations). Code merging service 110 can automatically perform the resolution or prompt a user to confirm the resolution before performing the resolution. For example, the system may automatically perform certain types of conflicts, and provide a recommendation (or request confirmation) to a user with respect to certain other types of conflicts. Code merging service 110 (e.g., database layer 112) can store a mapping of conflicts (e.g., conflicts, types of conflicts, types of resolution operations, etc.) to an indication of whether the system is to automatically resolve the conflict or to prompt a user for confirmation/acceptance, and in response to code merging service 110 determining a resolution, code merging service 110 checks the mapping to determine whether to automatically resolve the conflict or to prompt a user for confirmation/acceptance.

In various embodiments, code merging service 110 performs a mergeability check (e.g., enforces mergeability) according to a predetermined schedule/frequency, or in response to one or more criteria being satisfied. Examples of a predetermined schedule or frequency is daily (e.g., during off-peak hours), weekly, monthly, etc. Examples of the one or more criteria include (i) a threshold number of changes having been made to a particular version of code, (ii) a degree/extent of a difference between a particular version of code and a predetermined baseline or reference version of code, (iii) receipt of an indication that a version of code is to be committed such as an instruction from a user, (iv) receipt of an indication that a particular change to the version of code is to be committed, (v) receipt to of an indication that a particular version of code is to be pushed as a release, and/or (vi) receipt of a request to enforce/ensure mergeability with another version of code such as a particular other version of code, or an ancestor version(s) and/or descendant version(s) of code determined according to a predetermined rule set or policy (e.g., a policy indicating a number of ancestors or descendants with which to enforce mergeability), etc.

In some embodiments, in connection with merging a version of code with another version of code (e.g., an ancestor version(s) of code and/or the descendant version(s) of code), code merging service 110 uses merging layer 114 to determine a type of merge to perform. For example, merging layer 114 determines whether to perform a squash merge or a non-squash merge. In some embodiments, merging layer 114 always performs a non-squash merge unless it is facilitating the merging of an initial (first) version of code. In some embodiments, merging layer 114 determines the type of merge based at least in part on a number of changes or extent of modifications made to the version of code to be merges. In some embodiments, merging layer 114 determines the type of merge based at least in part on whether a version of code to be merged comprises a particular type of change. Determination of a type of merge to be performed may be based at least in part on one or more of (or any combination thereof): (i) an indication provided by a system or user requesting the merge, (ii) an indication that the version of code is being committed in connection with pushing a release, (iii) a determination that a number of changes to be committed exceed a threshold number of changes, (iv) a determination that the set of changes to be committed include a particular type(s) of change, (v) a type of change, (vi) an indication that a user desires to maintain record of the commit for a particular set of one or more changes, etc. Various other factors may be used in connection with determining a type of merge to be performed.

In response to determining to merge the version of code with another version of code (e.g., an ancestor and/or descendant version of code), merging layer 114 performs the merge. In various embodiments, merging layer 114 performs a reverse merge in connection with merging the version of code. According to various embodiments, performing a reverse merge comprises cloning (e.g., creating a copy) of the version of code for which changes are to be committed (e.g., merged with respect to other versions of code), and merging the other versions of code (e.g., the ancestor version(s) of code and/or descendant version(s) of code) to the clone version of code. As an example, in the case of merging a first version of code to a release version of code, merging layer 114 clones the first version of code, and merges the release version of code to the clone of the first version of code to obtain a new release version of code. Merging the release version of code to the clone of the first version of code includes determining a difference between the release version of code and the clone of the first version of code and committing changes to the clone of the first version of code. According to various embodiments, merging layer 114 performs a reverse merge with respect to all merging operations (e.g., in connection with merging the first version with any other version of code), or with respect to a subset of the merging operations (e.g., in connection with performing a merge with respect to a subset of the other versions of code).

According to various embodiments, data store 120 stores raw data such as versions of code. For example, in response to committing code, code merging service 110 stores the code (or a copy of the code) to data store 120. Data store may also store historical information pertaining to resolving past conflicts, such as a set of one or more operations performed to resolve a particular past conflict. In some embodiments, code merging service 110 communicates with (e.g., accesses) data store 120 to obtain the raw data in connection with managing/maintaining versions of code or otherwise enforcing mergeability across a plurality of versions of code.

According to various embodiments, system 100 comprises an administrator system 130 for use by an administrator such as an administrator of code merging service 110.

For example, administrator system 130 comprises a system for communication, data access, computation, etc. An administrator uses administrator system 130 to maintain data store 120 (e.g., maintain versions of code comprised in data store 120), to define and manage thresholds or policies used in connection with the enforcement of mergeability of versions of code, or the merging of the versions of code. For example, an administrator uses administrator system 130 to define one or more version level thresholds that are to be implemented with respect to enforcing mergeability of a particular version of code, etc. Administrator system 130 communicates with code merging service 110 via an interface. For example, administrator system 130 communicates with code merging service 110 via a web-interface provided on a web-browser installed on administrator system 130. As an example, administrator system 130 communicates with code merging service 110 via an application running on administrator system 130.

According to various embodiments, system 100 comprises client system 140. Client system 140 is used by a user (e.g., a developer such as a developer of code) to communicate with code merging service 110 and/or data store 120. As an example, client system 140 communicates with code merging service 110 via a web-interface. In some embodiments, a user uses client system 140 to develop code at code merging service 110, to request that code be committed, to request merging of a plurality of versions of code, to push a release, etc.

In some embodiments, database layer 112, merging layer 114, and/or business application layer 116 are implemented on a single server or a plurality of servers. For example, merging layer 114 and database layer 112 are different modules running on a same server or set of servers. As another example, merging layer 114 and business application layer 116 are different modules running on a same server or set of servers. In some embodiments, code merging service 110 and/or data store 120 are implemented on a single server or a plurality of servers.

Figure 2:
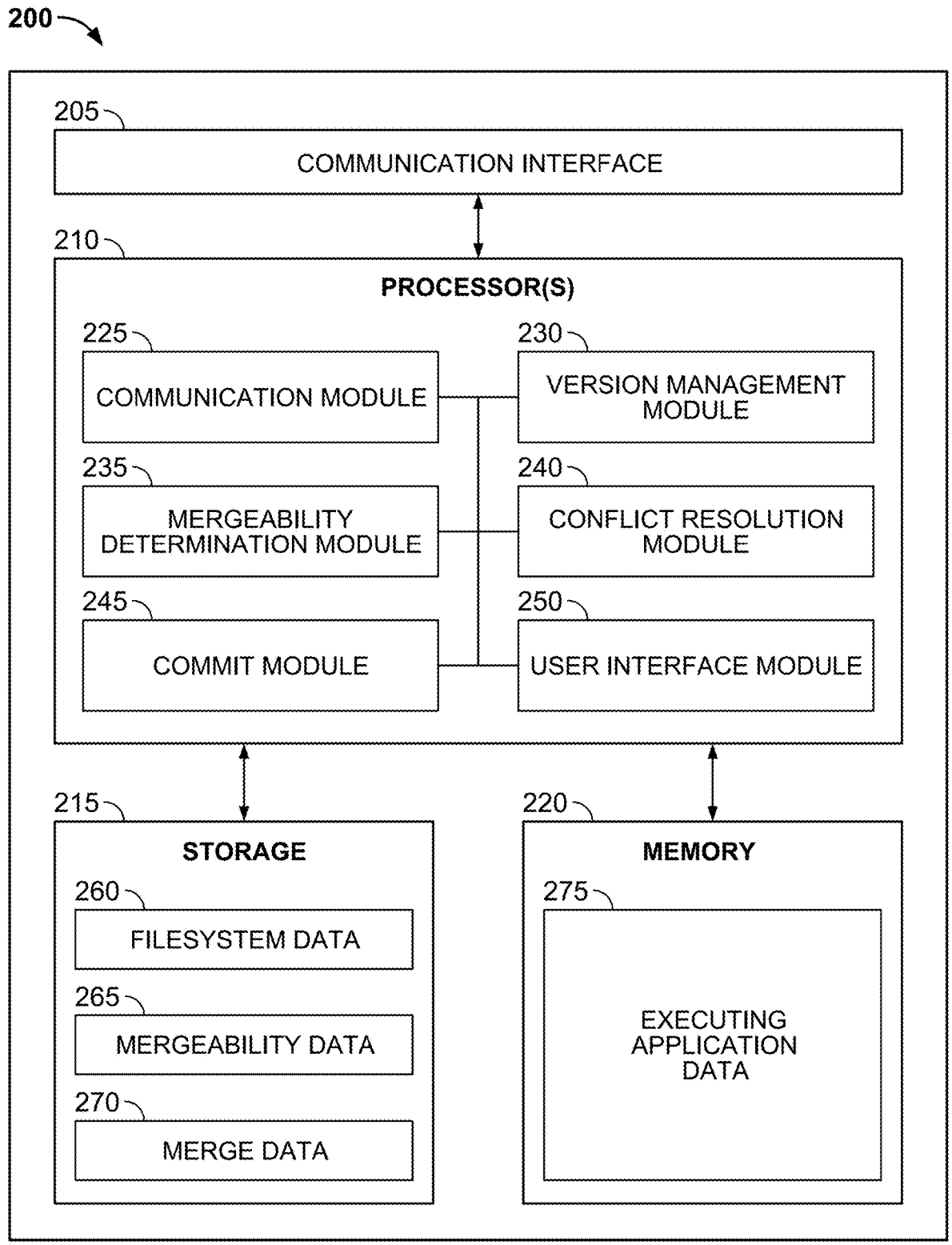
FIG. 2 is a block diagram of a code merging system according to various embodiments of the present application.

FIG. 2 is a block diagram of a code merging system according to various embodiments of the present application. In some embodiments, system 200 comprises, or corresponds to, merging layer 114, business application layer 116, and/or database layer 112. System 200 may implement at least part of system 100 of FIG. 1. System 200 may implement at least part of process 500 of FIG. 5, process 600 of FIG. 6, process 700 of FIG. 7, process 800 of FIG. 8, process 900 of FIG. 9, and/or process 1000 of FIG. 10. According to various embodiments, system 200 corresponds to, or comprises, a system for enforcing mergeability across versions of code and/or for merging versions of code. System 200 corresponds to, or comprises, a system to cause a resolution to be performed with respect to a set of conflicts (e.g., mergeability conflicts) expected to arise in the event that a set of versions of code are merged.

In the example shown, system 200 implements one or more modules in connection with profiling performance of a service, execution of an application, and/or execution of a set of code, obtaining information pertaining to a plurality of thread dumps, transforming information pertaining to a plurality of thread dumps to a relational model and/or latency information, determining one or more performance parameters associated with the service or execution of the application and/or the set of code, performing a regression analysis with respect to the latency information or information pertaining to a plurality of thread dumps, detecting anomalies and/or performance regressions with respect to the service or execution of the application and/or the set of code, configuring a report or dashboard (e.g., with a performance profile), etc. System 200 comprises communication interface 205, one or more processors 210, storage 215, and/or memory 220. One or more processors 210 comprises one or more of communication module 225, version management module 230, mergeability determination module 235, conflict resolution module 240, commit module 245, and/or user interface module 250.

In some embodiments, system 200 comprises communication module 225. System 200 uses communication module 225 to communicate with various client terminals or user systems such as a user system or an administrator system, or other layers of system 100 such as a database layer, business application layer, etc. For example, communication module 225 provides to communication interface 205 information that is to be communicated. As another example, communication interface 205 provides to communication module 225 information received by system 200. Communication module 225 is configured to receive one or more queries or requests to execute tasks such as from various client terminals or user systems (e.g., from the terminals or systems via a business application layer). The one or more queries or requests to execute tasks is with respect to information (e.g., a version(s) of code) stored in one or more datasets. As an example, the query or requests to execute tasks include one or more of (i) a request to merge versions of code, (ii) a request to perform a mergeability check, (iii) a request to commit a version of code, (iv) a request to push a release of code, (v) a request to execute one or more operations to resolve a mergeability conflict, etc. Communication module 225 is configured to provide to various client terminals or user systems information such as information that is responsive to one or more queries or tasks requested to be executed. In some embodiments, communication module 225 provides the information to the various client terminals or user systems information in the form of one or more reports (e.g., according to a predefined format or to a requested format), and/or via one or more user interfaces (e.g., an interface that user system is caused to display).

In some embodiments, communication module 225 is configured to receive information and/or an instruction pertaining to a modification of a version of code or an upload of a new version of code. For example, a user uses a client terminal to configure a version of code or a merging of versions of code on system 200. Communication module 225 can receive a request to create a new branch of code (e.g., a new version of code depending on a particular other version of code, etc.).

In various embodiments, system 200 comprises version management module 230. System 200 uses version management module 230 to manage/monitor dependency relationships among a set of versions of code (e.g., versions of code being managed/maintained by system 200). Version management module 230 updates the dependency relationships among versions of code based at least in part on a change to a version of code, creation of a new version of code (e.g., a new branch of code is created), deletion of a version of code, etc. In some embodiments, version management module 230 updates the dependency relationships among versions of code in response to such change to a version of code, creation of a new version of code (e.g., a new branch of code is created), or deletion of a version of code. For example, system 200 monitors the versions of code and/or development of code by users associated with the versions of code, and in response to detecting a change to a version of code, a creation of a new version of code, or a deletion of a version of code, system 200 uses version management module 230 to update the dependency relationships in real-time (e.g., contemporaneous with the event impacting the dependency relationships among managed versions of code.

Version management module 230 stores (e.g., to storage 215) relational information such as dependency information among various versions of code. For example, the version management module 230 stores/maintains information (e.g., metadata) pertaining to a particular version of code, including one or more of a version name, a version number, a date of release/implementation, a last modified date, an expiration date (e.g., a date when the release is no longer valid/approved, a date when the release was replaced by another release, etc.), an ancestor version(s) (e.g., version(s) from which the particular version of code is branched, etc., if any), a descendant version(s) (e.g., version(s) that are created as branches to the particular version of code, etc., if any), etc. Version management module 230 can use the metadata pertaining to particular versions of code in connection with determining/mapping dependencies across versions of code. Version management module 230 can further store a mapping of versions of code and corresponding ancestor versions and/or descendant versions (or the information stored in association with a particular version of code including, for example, corresponding ancestor versions and/or descendant versions, etc.). As an example, the mapping of versions of code is dynamically updated based on the modification of versions of code, or the creation of new versions of code such as a new branch being created with respect to a particular version of code.

In various embodiments, system 200 comprises mergeability determination module 235. System 200 uses mergeability determination module 235 in connection with determining whether at least two versions of code are mergeable (e.g., determine whether merging the at least two versions would create a set of conflicts across the versions of code). In some embodiments, system 200 uses mergeability determination module 235 to determining whether the at least two versions of code are mergeable in response to a request/determination to merge the at least to versions of code, such as to identify the set of conflicts that are to be resolved before committing the merge. In some embodiments, system 200 uses mergeability determination module 235 to determining whether the at least two versions of code are mergeable in connection with maintaining the at least two versions of code in a mergeability state (e.g., in a state according to which if the versions of code were to be merged no mergeability conflicts are expected to arise). For example, mergeability determination module 235 assesses the mergeability of the at least two versions of code according to a predetermined schedule/frequency. As another example, mergeability determination module 235 assesses the mergeability of the at least two versions of code in response to determining that a change to one of the versions of code is committed, or in response to receiving a request to commit the change to the version of code. As another example, mergeability determination module 235 assesses the mergeability of the at least two versions of code in response to one or more criteria being satisfied. Examples of a predetermined schedule or frequency is daily (e.g., during off-peak hours), weekly, monthly, etc. Examples of the one or more criteria include (i) a threshold number of changes having been made to a particular version of code, (ii) a degree/extent of a difference between a particular version of code and a predetermined baseline or reference version of code, (iii) receipt of an indication that a version of code is to be committed such as an instruction from a user, (iv) receipt of an indication that a particular change to the version of code is to be committed, (v) receipt to of an indication that a particular version of code is to be pushed as a release, and/or (vi) receipt of a request to enforce/ensure mergeability with another version of code such as a particular other version of code, or an ancestor version(s) and/or descendant version(s) of code determined according to a predetermined rule set or policy (e.g., a policy indicating a number of ancestors or descendants with which to enforce mergeability), etc.

In response to determining that mergeability of a first version of code (e.g., mergeability of a first version of code with at least another version of code) is to be assessed, mergeability determination module 235 queries version management module 230 to obtain the other versions of code (e.g., ancestor version(s) of code and/or descendant version(s) of code) with which mergeability of the version of code is to be assessed. Version management module 230 queries the dependency information to determine the set of versions of code having a dependency relationship with the first version of code. For example, version management module 230 queries the mapping of mapping of versions of code and corresponding ancestor versions and/or descendant versions in connection with obtaining the set of versions of code having a dependency relationship with the first version of code. Because development of code can invoke numerous branches of code having numerous dependencies, assessing mergeability across such numerous versions of code can be resource intensive and such a complete assessment may have marginal value with respect to loosely dependent versions of code. Accordingly, in some embodiments, a version levels threshold (e.g., a predefined descendant level threshold and/or predefined ancestor level threshold) is used to determine the one or more ancestor versions of code and/or one or more descendant versions of code for which mergeability is to be assessed. For example, the version levels threshold is used to limit the set of versions of code having a dependency relationship with the first version of code to a subset thereof for which mergeability is to be assessed or enforced. As an example, mergeability determination module 235 uses the version levels threshold(s) to determine the subset for which mergeability is to be assessed from the set of versions of code having a dependency relationship with the first version of code returned by the version management module 230. As another example, version management module 230 uses the version levels threshold(s) to determine the subset, which is then returned to mergeability determination module 235.

In some embodiments, the version levels threshold(s) includes (i) a descendant level threshold pertaining to a threshold of a degree to which descendant versions of code (e.g., descendant versions of code) are to be considered, and/or (ii) an ancestor level threshold pertaining to a threshold of a degree to which ancestral versions of code (e.g., ancestor versions of code) are to be considered. The descendant level threshold may be equal to the ancestral level threshold, or the descendant level threshold and the ancestral level threshold may be different (e.g., the descendant level threshold and the ancestral level threshold may be separately configurable). In some embodiments, system 200 enforces/ensure mergeability and/or merges a particular version of code with N ancestors, and M descendants, where N and M are respectively positive integers (which may be the same or different). For example, mergeability determination module 235 assesses mergeability with respect to N ancestors, and M descendants of the first version of code. As an example, a user such as a developer or administrator of first version of code can configure the version levels threshold via an interface provided at the corresponding administrator system or client system.

In response to determining to assess mergeability with respect to versions of code, mergeability determination module 235 determines a set of conflicts (e.g., mergeability conflicts) that are expected to arise by a merging of the versions of code. For example, mergeability determination module 235 determines differences between first version of code and the one or more ancestor versions of code and/or one or more descendant versions of code for which mergeability is to be assessed and determines whether the differences would cause a set of conflicts if the first version of code was merged with the one or more ancestor versions of code and/or one or more descendant versions of code.

In various embodiments, system 200 comprises conflict resolution module 240. System 200 uses conflict resolution module 240 to cause the set of conflicts (e.g., the mergeability conflicts identified by mergeability determination module 235 in connection with assessing mergeability) to be resolved. Resolving a conflict can include performing one or more operations with respect to a version of code (e.g., the first version of code or the ancestor version of code, and/or descendant version of code) to modify such a version of code in a manner that if the merge was performed the corresponding expected conflict would not arise. In some embodiments, conflict resolution module 240 automatically causes the set of conflicts to be resolved in response to mergeability determination module 235 identifying the set of conflicts. In embodiments, conflict resolution module 240 causes the set of conflicts to be resolved according to a predetermined schedule/frequency, or in response to a determination that one or more predefined criteria are satisfied. Causing the set of conflicts to be resolved can include one or more of (i) automatically determining one or more operations to attempt to resolve a conflict and performing the one or more operations, (ii) determining one or more operations to attempt to resolve a conflict, and providing a recommendation to a user (e.g., developer) corresponding to the one or more operations or otherwise prompting a user to confirm that the one or more operations are to be performed, and/or (iii) creating a task for one or more users to resolve the one or more conflicts, and communicating an indication of the task to the one or more users.

In some embodiments, causing the set of conflicts to be resolved includes conflict resolution module 240 automatically performing (e.g., without user intervention) the one or more operations that system 200 predicts will resolve a conflict. System 200 can predict the one or more operations based at least in part on a model (e.g., a resolution model such as a model developed using a machine learning process) and/or historical information pertaining to resolutions of historical conflicts.

In some embodiments, causing the set of conflicts to be resolved includes conflict resolution module 240 automatically predicts (e.g., without user intervention) one or more operations that system 200 predicts will resolve a conflict, and prompts a user to confirm that the one or more operations are to be performed, or to select from among options of operations to perform to resolve the conflict. As an example, system 200 prompts the user for manual confirmation of the one or more operations, or selection from among a set of recommendations based at least in part on a predefined conflict resolution policy. The conflict resolution policy can indicate that the user is to be prompted for all conflicts, a subset of a type of conflicts, or if a predicted likelihood of success that the predicted resolution (e.g., one or more operations) is less than a predefined resolution success threshold.

In some embodiments, causing the set of conflicts to be resolved includes generating a task for a user to resolve (e.g., manually resolve) the conflict. System 200 (e.g., conflict resolution module 240) uses communication module 225 to communicate the task (or an indication of the task) to a user (e.g., a user associated with an administrator system or a client system). A user may manually modify one or more versions of code to resolve the conflict. For example, the user uses a client system to input a modification to the one or more versions of code. Conflict resolution module 240 may monitor the version(s) of code for a modification or may otherwise receive the modification from the client system. In some embodiments, in response to the user manually modifying the one or more versions of code, conflict resolution module 240 causes mergeability determination module 235 to assess whether any conflicts remain, or specifically whether the conflict associated with the received modification was resolved.

In some embodiments, system 200 comprises commit module 245. System 200 uses commit module 245 to commit a change/modification to code (e.g., a first version of code) and/or to commit a merge of versions of code. In the example of using commit module 245 to commit a change/modification to code, commit module 245 stores a set of modifications (e.g., updates the stored version of code with the modifications input by a user). Commit module can correspondingly provide a notice of such commit to mergeability determination module 235 in connection with invoking an enforcement of mergeability with one or more other versions of code, and/or a notice of such commit to version management module 230 in connection with invoking an update to a dependency relationship among versions of code. In the example of using commit module 245 to commit a merge of versions of code, commit module 245 can determine a type of merge, and perform the merge.

In some embodiments, in connection with merging a version of code with another version of code (e.g., an ancestor version(s) of code and/or the descendant version(s) of code), commit module 245 determines a type of merge to perform. For example, commit module 245 determines whether to perform a squash merge or a non-squash merge. In some embodiments, if it is a first version change, then squash/non-squash merge selection is based at least in part on a user policy, and otherwise the merge should be a non-squash merge. In some embodiments, commit module 245 determines the type of merge based at least in part on a number of changes or extent of modifications made to the version of code to be merges. In some embodiments, commit module 245 determines the type of merge based at least in part on whether a version of code to be merged comprises a particular type of change. Determination of a type of merge to be performed may be based at least in part on one or more of (or any combination thereof): (i) an indication provided by a system or user requesting the merge, (ii) an indication that the version of code is being committed in connection with pushing a release, (iii) a determination that a number of changes to be committed exceed a threshold number of changes, (iv) a determination that the set of changes to be committed include a particular type(s) of change, (v) a type of change, (vi) an indication that a user desires to maintain record of the commit for a particular set of one or more changes, etc. Various other factors may be used in connection with determining a type of merge to be performed.

In response to determining to merge the version of code with another version of code (e.g., an ancestor and/or descendant version of code), commit module 245 performs the merge. In various embodiments, commit module 245 performs a reverse merge in connection with merging the version of code. According to various embodiments, performing a reverse merge comprises cloning (e.g., creating a copy) of the version of code for which changes are to be committed (e.g., merged with respect to other versions of code), and merging the other versions of code (e.g., the ancestor version(s) of code and/or descendant version(s) of code) to the clone version of code. As an example, in the case of merging a first version of code to a release version of code, commit module 245 clones the first version of code, and merges the release version of code to the clone of the first version of code to obtain a new release version of code, and stores the new release version of code (e.g., to storage 215 or other remote storage system). In some embodiments, in response to obtaining the new release version of code (or other version of code resulting from a merge such as an updated descendant version of code), system 200 performs a check such as a validation with respect to the new release version of code. Merging the release version of code to the clone of the first version of code includes determining a difference between the release version of code and the clone of the first version of code and committing changes to the clone of the first version of code. According to various embodiments, commit module 245 performs a reverse merge with respect to all merging operations (e.g., in connection with merging the first version with any other version of code), or with respect to a subset of the merging operations (e.g., in connection with performing a merge with respect to a subset of the other versions of code).

In some embodiments, system 200 comprises user interface module 250. System 200 uses user interface module 250 in connection with configuring information (or the display thereof) to be provided to the user such as via administrator system 135 or client system 140 of system 100 of FIG. 100. User interface module 250 is implemented by business application layer 116 of system 100 of FIG. 1. In some embodiments, user interface module 250 configures a user interface to be displayed at a client terminal used by the user or administrator, such as an interface that is provided in a web browser at the client terminal. In some embodiments, user interface module 250 configures the information to be provided to the user such as configuring one or more reports of information that is responsive to a query or task executed with respect to database system 105 (e.g., a query or task executed against one or more datasets), a task assigned to the user in connection with causing a conflict to be resolved, an indication of a set of conflicts associated with mergeability of versions of code.

According to various embodiments, storage 215 comprises one or more of filesystem data 260, mergeability data 265, and/or merge data 270. Storage 215 comprises a shared storage (e.g., a network storage system) and/or database data, and/or code data such as a metadata pertaining to versions of code, dependency information, historical information pertaining to resolutions to historical conflicts, etc. In some embodiments, filesystem data 260 comprises a database such as one or more datasets (e.g., one or more datasets for one or more tenants, etc.). Filesystem data 260 comprises data such as a dataset of a set of versions of code, a dataset for training a machine learning process (e.g., to train a resolution model), historical information pertaining user activity (e.g., a log of modifications to code), historical information pertaining to resolutions to historical conflicts, etc.), a log of committed modifications to versions of code. In some embodiments, mergeability data 265 comprises information pertaining to a set of conflicts identified in connection with enforcing/ensuring mergeability of versions of code and/or information pertaining to one or more operations to be performed to resolve a conflict, a set of tasks assigned to one or more users in connection with resolving a conflict, a status of the set of tasks, a task or query being executed, etc. In some embodiments, merge data 270 comprises information pertaining to merging of versions of code (e.g., a resulting version of code to be stored in the data store), a log of commits performed in connection with a merge, etc.

According to various embodiments, memory 220 comprises executing application data 275. Executing application data 275 comprises data obtained or used in connection with executing an application. In embodiments, the application comprises one or more applications that perform one or more of receive and/or execute a query or task, generate a report and/or configure information that is responsive to an executed query or task, and/or to provide to a user information that is responsive to a query or task, provide a code development environment, to obtain modifications to code, to obtain resolutions to conflicts, to prompt a user to perform a task or to otherwise provide a resolution to a conflict (e.g., a modification to a version of code, a selection of one or more operations to perform, a confirmation of a proposed resolution, etc.). Other applications comprise any other appropriate applications (e.g., an index maintenance application, a communications application, a chat application, a web browser application, a document preparation application, a report preparation application, a user interface application, a data analysis application, an anomaly detection application, a user authentication application, etc.).

FIG. 3A is a diagram of a relational model for a set of versions of code according to various embodiments of the present application. In some embodiments, metadata is stored for determining ancestor dependency and/or descendant dependency for code in a repository. In some embodiments, the metadata is used to generate a dependency mapping—for example, indications of one or more descendant relations and/or one or more ancestor relations between code versions stored in one or more repositories. In some embodiments, the metadata is stored in the format of relational model 300. In the example shown, relational model 300 stores information pertaining to a set of versions of code. For example, relational model 300 stores a mapping of versions of code to ancestor and/or descendant versions of code for a particular software program/service being developed. In the example illustrated in FIG. 3A, relational model 300 stores metadata comprising a code version field 305, start date field 310 (e.g., when the version of code was first deployed or created as a new branch), end date field 315 (e.g., when the version of code was terminated or rendered invalid), version prefix field 320 or other version identifier, descendant version field 325 that comprises a set of descendant versions of code corresponding to the particular version of code identified in the code version field 305, and/or an ancestor version field 330 that comprises a set of ancestor versions of code corresponding to the particular version of code identified in the code version field 305.

As an example, as shown in FIG. 3A, the version of code corresponding to Redsox.1 has a descendant version of code corresponding to Yankee.0 (e.g., as identified in the corresponding descendant version field 325), and ancestor versions of code corresponding to BlueJay.2 and Redsox.0 (e.g., as identified in the corresponding ancestor version field 330). As another example, with respect to the version of code corresponding to BlueJays.2, the version of code has two descendant branches: Redsox.1 and Dodger.1 (e.g., as identified in the corresponding descendant version field 325), and the version of code corresponding to BlueJays.2 has an ancestor version of code corresponding to BlueJays.1. BlueJays.2 may have been respectively branched to permit different teams of developers to develop different feature sets.

Figure 3B:
FIG. 3B is a diagram of a relational model for a set of versions of code according to various embodiments of the present application.

FIG. 3B is a diagram of a relational model for a set of versions of code according to various embodiments of the present application. Relational model 350 stores information pertaining to a set of versions of code. As illustrated in FIG. 3B, relational model 350 provides an indication of different branches of code (e.g., BlueJays, Redsox.2, Redsox.1) that branch from a primary version of code (e.g., an original version of code from which the software is being developed, a master version, etc.).

Figure 4A:
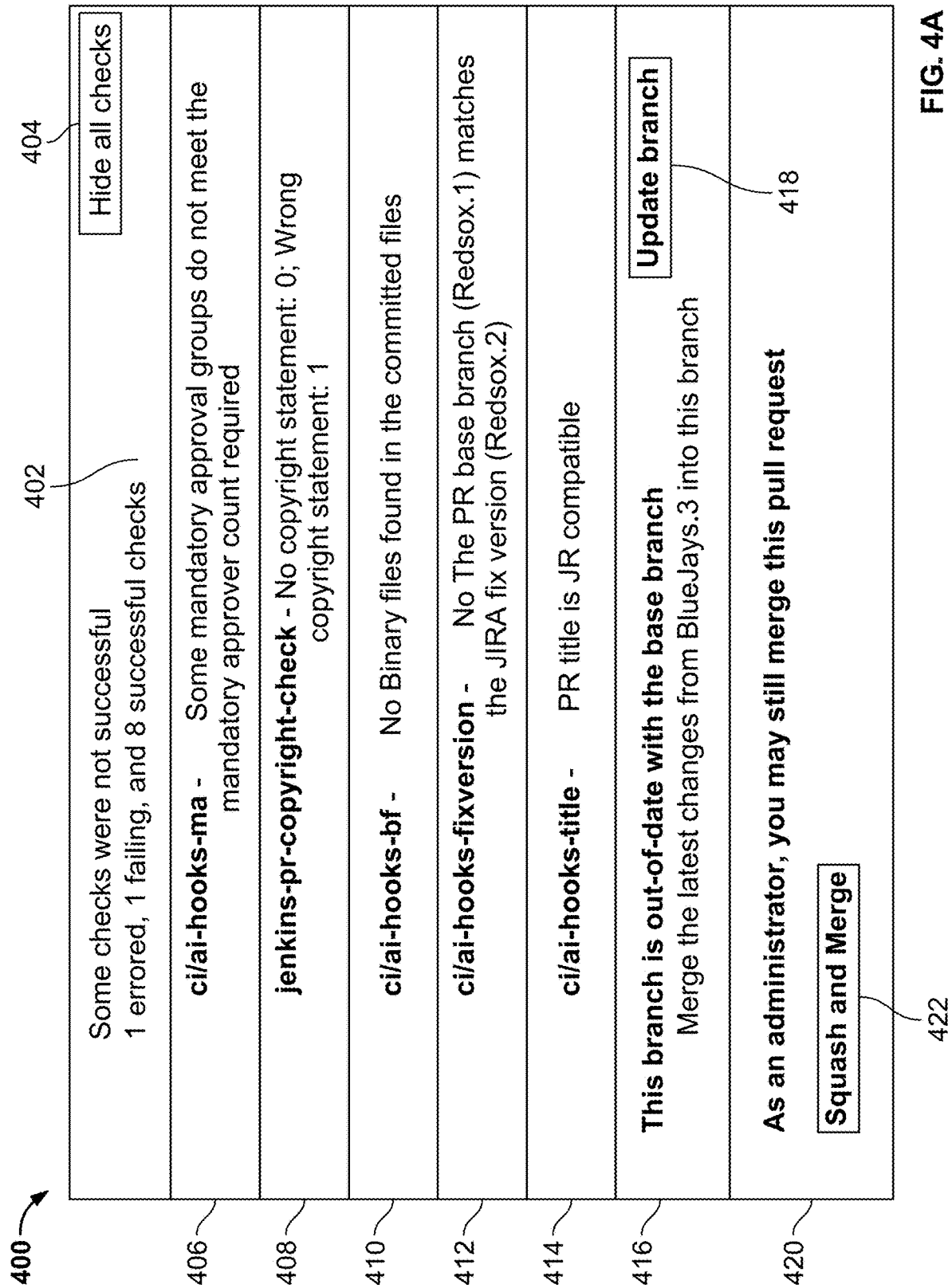
FIG. 4A is a diagram of an interface associated with merging versions of code according to various embodiments of the present application.

FIG. 4A is a diagram of an interface associated with merging versions of code according to various embodiments of the present application. In the example shown in FIG. 4A, interface 400 corresponds to a user interface provided at a client system (or administrator system). Interface 400 is generated, for example, in response to code merging service 110 or system 200 assessing mergeability of a particular version of code with other versions of code.

In some embodiments, interface 400 comprises a summary field 402 that provides a summary of the mergeability of the version of code (e.g., a number of conflicts, a number of failed commits, a number of successful checks/modifications), etc. Interface 400 can further include element 404 via which a user can select to hide the detailed information of the checks performed (e.g., to collapse fields 406-416).

Interface 400 can further comprise detailed information pertaining to checks performed in connection with assessing mergeability of a version of code. For example, interface 400 includes fields 406, 408, 410, 412, 414, and 416 respectively corresponding to different checks performed. For example, indications include checks against various ancestor and/or descendent versions of code. Fields 406-416 include an indication of whether the corresponding check was successful (e.g., whether the version of code is compatible with merging with respect to another version of code). In the example shown, fields 406-412 correspond to conflicts, and field 414 corresponds to a passed check. Field 416 provides a status of the version of code, such as whether the version of code is up-to-date relative to other branches of the code. In the event that the current version of code is no up-to-date relative to another base branch of code, interface 400 provides element 418 via which a user can select to update the version of code with modifications made to the other version of code.

According to various embodiments, interface 400 comprises field 420 which provides information pertaining to merging the version of code with another version of code. For example, field 420 can comprise element 422 via which a user can select to merge the version of code. In some embodiments, element 422 indicates a type of merge, such as a squash merge. Field 420 can comprise a plurality of selectable elements respectively corresponding to different types of merges, or field 420 can include a field via which a user can select a type of merge to perform and a field to request that the merge be performed.

Figure 4B:
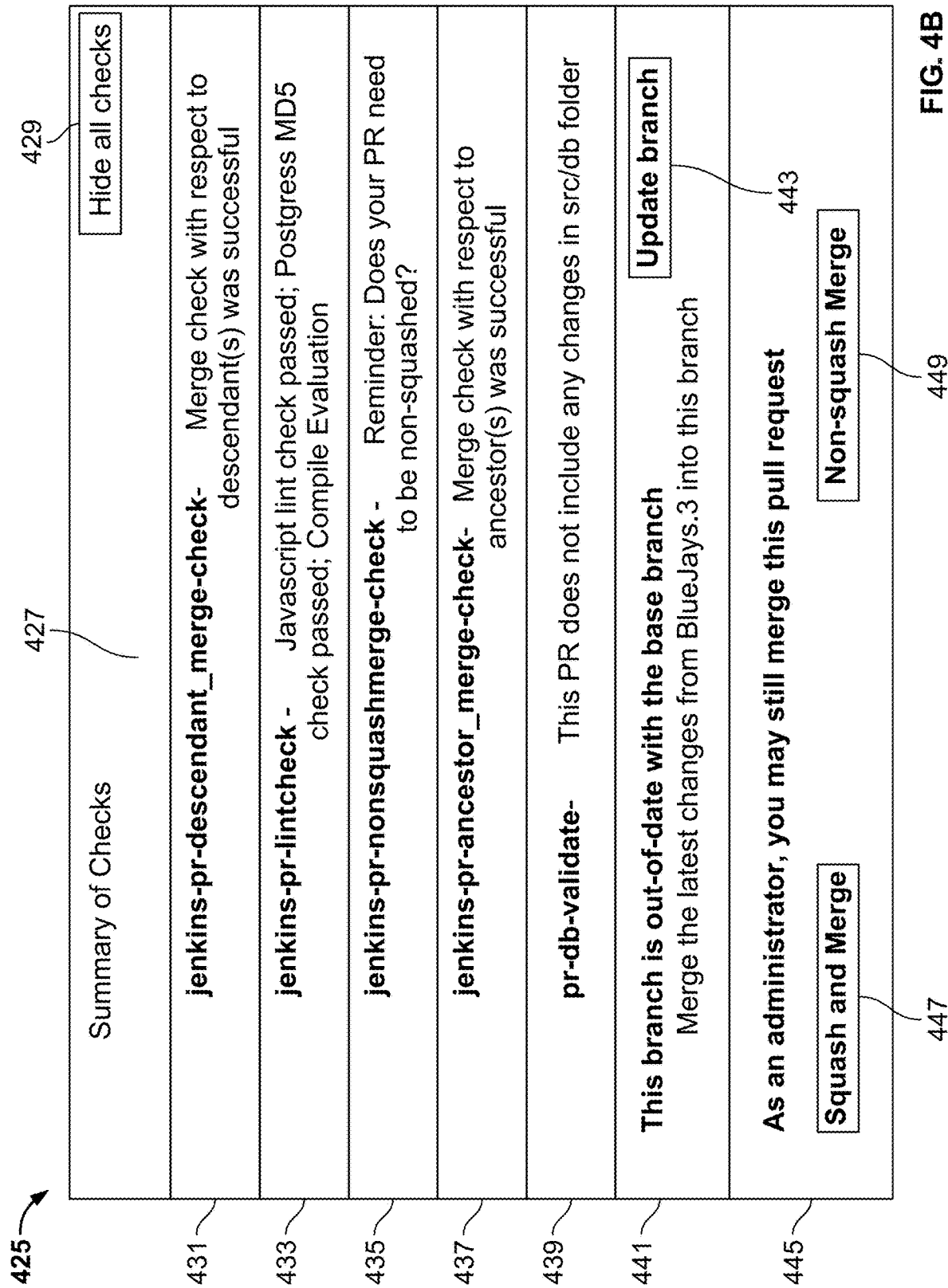
FIG. 4B is a diagram of an interface associated with merging versions of code according to various embodiments of the present application.

FIG. 4B is a diagram of an interface associated with merging versions of code according to various embodiments of the present application. In the example shown in FIG. 4B, interface 425 corresponds to a user interface provided at a client system (or administrator system). Interface 425 is generated, for example, in response to code merging service 110 or system 200 assessing mergeability of a particular version of code with other versions of code.

In some embodiments, interface 425 comprises a summary field 427 that provides a summary of the mergeability of the version of code (e.g., a number of conflicts, a number of failed commits, a number of successful checks/modifications), etc. Interface 425 can further include element 429 via which a user can select to hide the detailed information of the checks performed (e.g., to collapse fields 431-439).

In some embodiments, interface 425 comprises detailed information pertaining to checks performed in connection with assessing mergeability of a version of code. For example, interface 425 includes fields 431, 433, 435, 437, 439, and 441 respectively corresponding to different checks performed. Fields 431-441 include an indication of whether the corresponding check was successful (e.g., whether the version of code is compatible with merging with respect to another version of code). In the example shown in FIG. 4C, fields 455-461 correspond to conflicts, and fields 463 and 465 corresponds to a passed check.

According to various embodiments, interface 425 comprises field 445 which provides information pertaining to merging the version of code with another version of code. For example, field 445 can comprise an element(s) via which a user can select to merge the version of code. In some embodiments, the element(s) indicates a type of merge, such as a squash merge. Field 445 can comprise a plurality of selectable elements respectively corresponding to different types of merges, or field 445 can include a field via which a user can select a type of merge to perform and a field to request that the merge be performed. In the example illustrated in FIG. 4B, field 445 includes element 447 via which a user can select to perform a squash merge of the version of code. In the example illustrated in FIG. 4B, field 445 includes element 449 via which a user can select to perform a non-squash merge of the version of code.

Figure 4C:
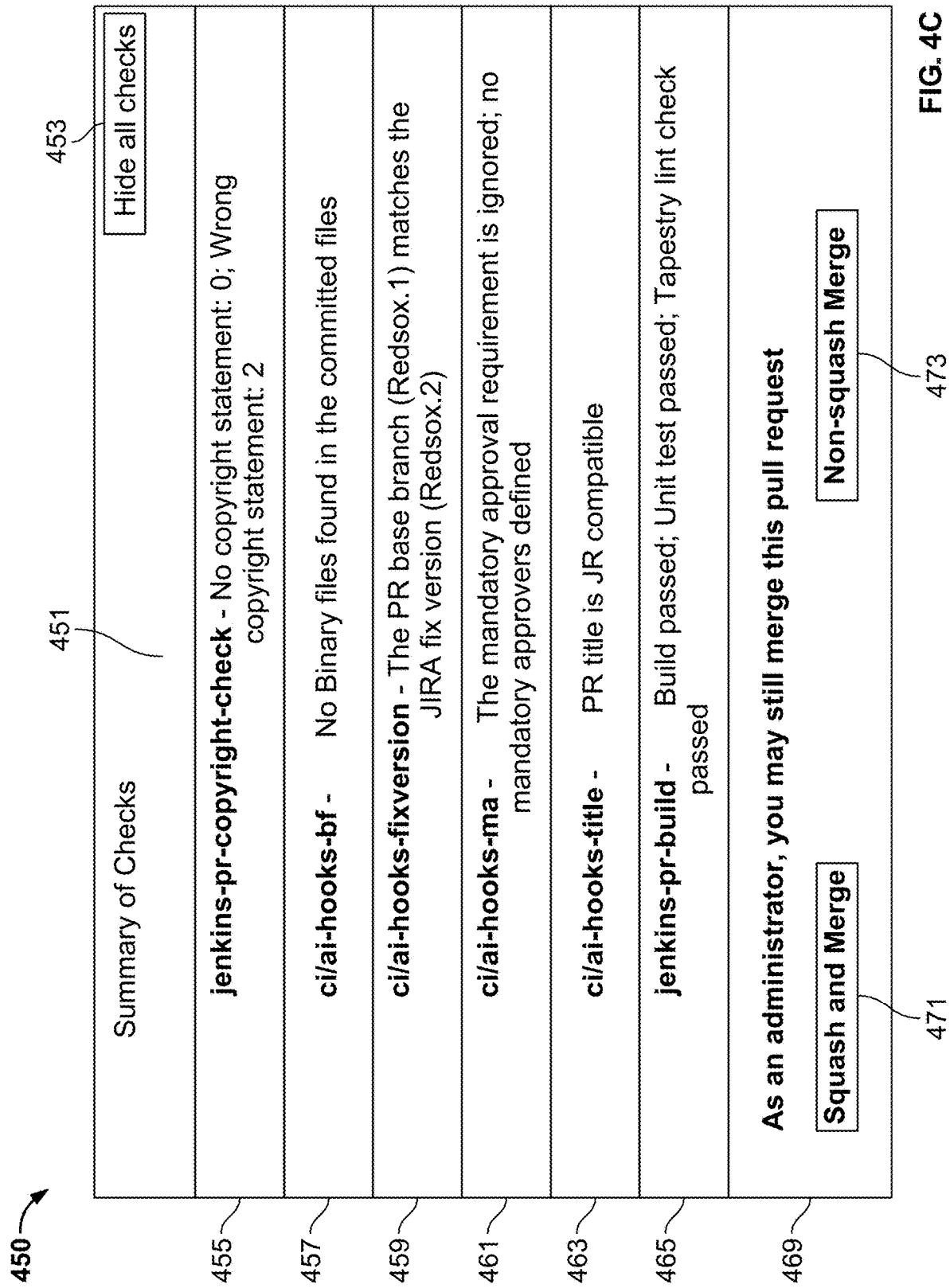
FIG. 4C is a diagram of an interface associated with merging versions of code according to various embodiments of the present application.

FIG. 4C is a diagram of an interface associated with merging versions of code according to various embodiments of the present application. In the example shown in FIG. 4C, interface 450 corresponds to a user interface provided at a client system (or administrator system). Interface 450 is generated, for example, in response to code merging service 110 or system 200 assessing mergeability of a particular version of code with other versions of code.

In some embodiments, interface 450 comprises a summary field 451 that provides a summary of the mergeability of the version of code (e.g., a number of conflicts, a number of failed commits, a number of successful checks/modifications), etc. Interface 450 can further include element 453 via which a user can select to hide the detailed information of the checks performed (e.g., to collapse fields 455-465).

In some embodiments, interface 450 comprises detailed information pertaining to checks performed in connection with assessing mergeability of a version of code. For example, interface 450 includes fields 455-465 respectively corresponding to different checks performed. Fields 4 include an indication of whether the corresponding check was successful (e.g., whether the version of code is compatible with merging with respect to another version of code). As an example, field 431 includes an indication of a result for a check of mergeability of the version of code with respect to a descendant(s) version(s) of code. In some embodiments, the system performs a mergeability check with respect to a threshold number of descendant versions, or a threshold number of degrees of descendant versions (e.g., only children; children and grandchildren; or children, grandchildren, and great grandchildren, etc.). As an example, field 435 includes an indication (e.g., a reminder) as to whether the merge to be performed is a squash merge or a non-squash merge. As an example, field 437 includes an indication of a result for a check of mergeability of the version of code with respect to an ancestor(s) version(s) of code. In some embodiments, the system performs a mergeability check with respect to a threshold number of ancestor versions, or a threshold number of degrees of ancestor versions (e.g., only parents; parents and grandparents; or parents, grandparents, and great grandparents, etc.). Field 437 can include an indication of whether the version of code is mergeable with respect to the ancestor(s) version(s) of code (e.g., an indication of whether the check was successful or not successful).

According to various embodiments, interface 450 comprises field 445 which provides information pertaining to merging the version of code with another version of code. For example, field 469 can comprise an element(s) via which a user can select to merge the version of code. In some embodiments, the element(s) indicates a type of merge, such as a squash merge. Field 469 can comprise a plurality of selectable elements respectively corresponding to different types of merges, or field 469 can include a field via which a user can select a type of merge to perform and a field to request that the merge be performed. In the example illustrated in FIG. 4C, field 469 includes element 471 via which a user can select to perform a squash merge of the version of code. In the example illustrated in FIG. 4C, field 469 includes element 473 via which a user can select to perform a non-squash merge of the version of code.

Figure 5:
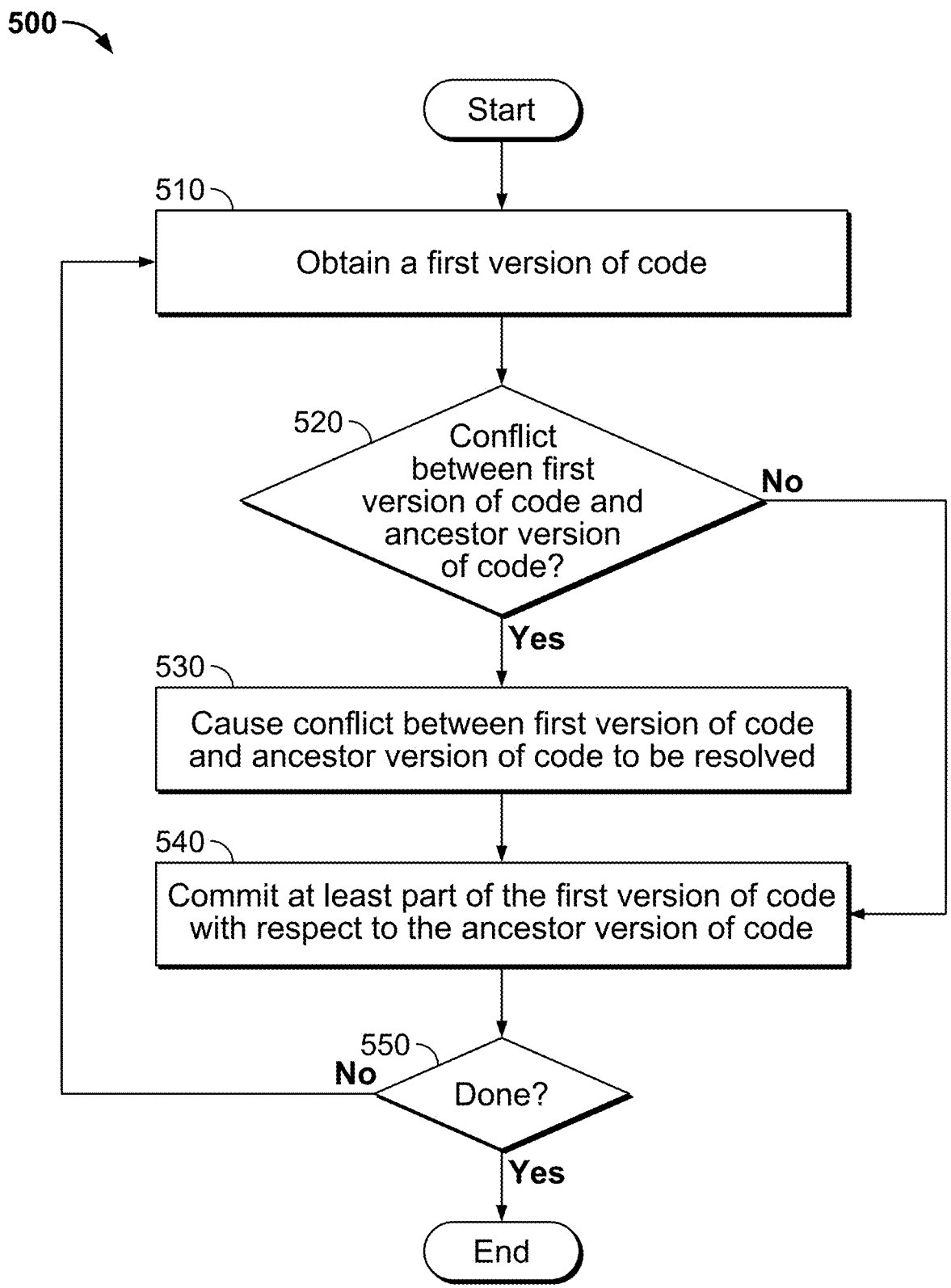
FIG. 5 is a flow diagram of a method for merging versions of code according to various embodiments of the present application.

FIG. 5 is a flow diagram of a method for merging versions of code according to various embodiments of the present application. According to various embodiments, process 500 is implemented at least in part by system 100 of FIG. 1 and/or system 200 of FIG. 2.

At 510, a first version of code is obtained. In some embodiments, the first version of code is obtained from a data system such as data store 120 of system 100 of FIG. 1 (e.g., via database layer 112). The system obtains the first version of code in response to one or more of (i) receiving an indication that a modification to the first code is being committed, (ii) determining to commit a modification to the first code, (iii) receiving an indication, or determining, that the first version of code is to be merged with another version of code, (iv) receiving an indication, or determining, that a version of code (e.g., the first version of code, or another version of code having a dependency relationship with the first code) is to be pushed as a release, (v) determining that a predetermined schedule or frequency has been elapsed/occurred, (vi) determining to perform a mergeability assessment with respect to the first version of code and one or more other versions of code having a dependency relationship with respect to the first version of code, etc. In some embodiments, the system obtains the first version of code from a client system such as in response to an upload/modification input by a user (e.g., a developer).

At 520, a determination is made as to whether a conflict exists between the first version of code and at least one ancestor version of code. In some embodiments, the system determines to perform a determination of whether the first version of code conflicts with at least one ancestor version of code in response to determining to perform a mergeability assessment with respect to the first version of code and one or more other versions of code. For example, the system determines to perform the mergeability assessment in connection with enforcing mergeability with respect to the first version of code and the one or more other versions of code. In some embodiments, the system determines to perform the determination of whether a conflict exists between the first version of code and a plurality of ancestor versions of code, or one or more ancestor versions of code and one or more descendant versions of code.

In some embodiments, the system determines whether the first version of code conflicts with the one or more ancestor versions of code and one or more descendant versions of code based at least in part on determining differences between first version of code and the one or more ancestor versions of code and/or one or more descendant versions of code for which mergeability is to be assessed, and determining whether the differences would cause a set of conflicts if the first version of code was merged with the one or more ancestor versions of code and/or one or more descendant versions of code. Examples of a conflict include merge conflicts, inconsistencies in features, functions, libraries, etc.

In response to determining that conflict exists between the first version of code and at least one ancestor version of code at 520, process 500 proceeds to 530 at which the conflict between the first version of code and the at least one ancestor version of code is caused to be resolved. In some embodiments, causing the conflict to be resolved includes invoking process 900 (or a part thereof) of FIG. 9. Thereafter, process proceeds to 540.

In response to determining that no conflict exists between the first version of code and at least one ancestor version of code at 520, process 500 proceeds to 540

At 540, at least part of the first version of code is committed with respect to the ancestor version of code. In some embodiments, the system commits the first version of code with respect to at least the ancestor version of code based at least in part on preforming a merge of the first version of code with respect to at least the ancestor version of code. Performing the merge may include invoking process 700 of FIG. 7 and/or process 1000 of FIG. 10, or part of process 700 or process 1000.

At 550, a determination is made as to whether process 500 is complete. In some embodiments, process 500 is determined to be complete in response to a determination that the merging of versions of code is complete, that no further versions of code are to be merged, no further un-committed changes to a version of code exist, the user has exited the system, an administrator indicates that process 500 is to be paused or stopped, etc. In response to a determination that process 500 is complete, process 500 ends. In response to a determination that process 500 is not complete, process 500 returns to 510.

Figure 6:
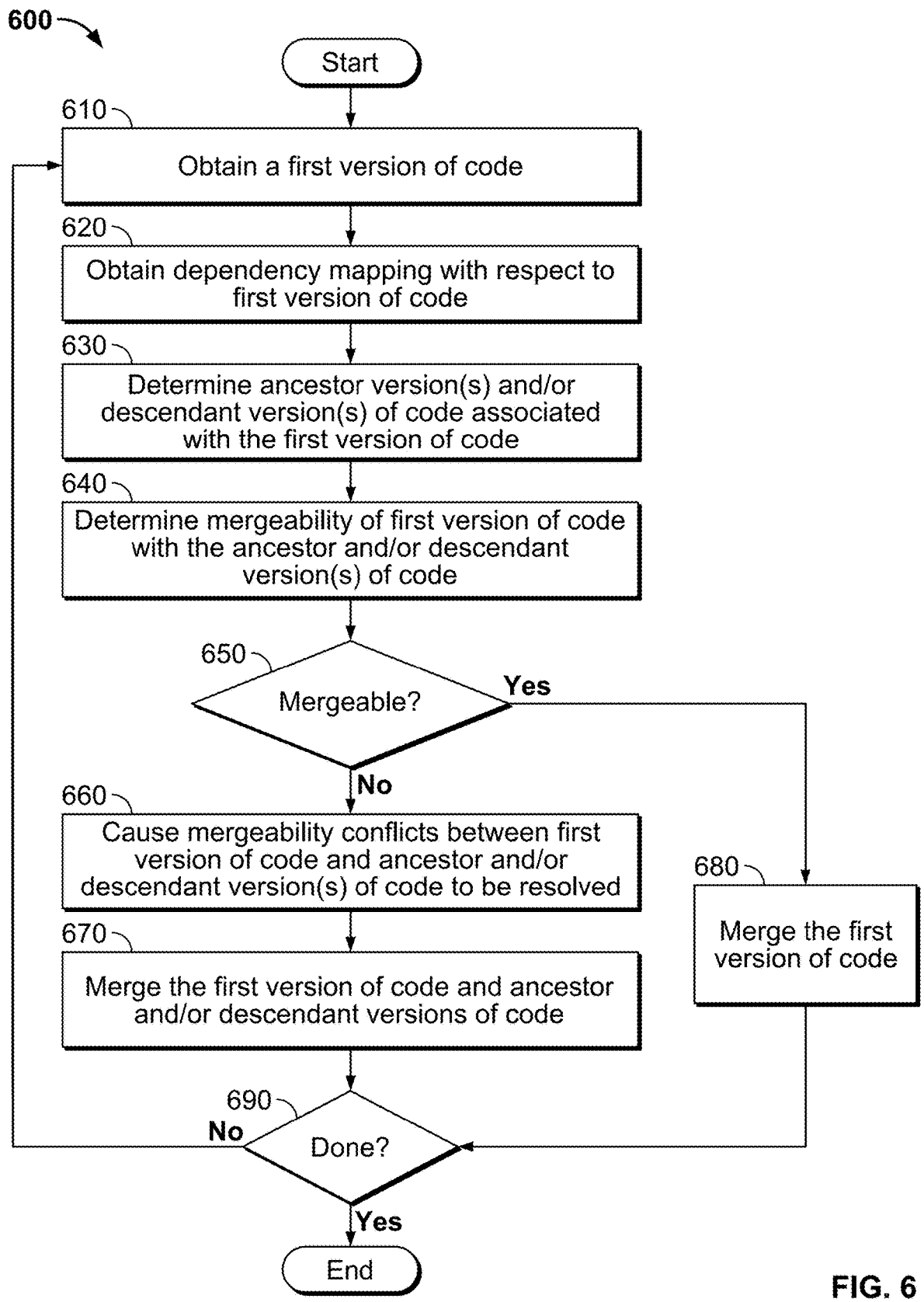
FIG. 6 is a flow diagram of a method for merging versions of code according to various embodiments of the present application.

FIG. 6 is a flow diagram of a method for merging versions of code according to various embodiments of the present application. According to various embodiments, process 600 is implemented at least in part by system 100 of FIG. 1 and/or system 200 of FIG. 2.

At 610, a first version of code is obtained. In some embodiments, 610 is the same as, or similar to, 510 of process 500 of FIG. 5.

At 620, a dependency mapping with respect to the first version of code is obtained. In some embodiments, the system obtains the dependency mapping with respect to the first version of code based at least in part on metadata stored in association with the first version of code and one or more other versions of code (e.g., one or more ancestor versions of code and/or one or more descendant versions of code, etc.). For example, the system stores one or more versions of code, and relational information (e.g., dependency relationships) among versions of code such as a mapping of mapping of versions of code and corresponding ancestor versions and/or descendant versions.

In some embodiments, the system stores a mapping of versions of code and corresponding ancestor versions and/or descendant versions (or the information stored in association with a particular version of code including, for example, corresponding ancestor versions and/or descendant versions, etc.). As an example, the mapping of versions of code is dynamically updated based on the modification of versions of code, or the creation of new versions of code such as a new branch being created with respect to a particular version of code.

At 630, ancestor version(s) and/or descendant version(s) of code associated with the first version of code are determined. In some embodiments, the system determines the ancestor version(s) and/or descendant version(s) of code associated with the first version based at least in part on the dependency mapping. For example, the system uses the first version of code (e.g., an identifier associated with the first version of code) in connection with querying the dependency mapping.

In some embodiments, the system uses the version levels threshold (e.g., a predefined descendant level threshold and/or predefined ancestor level threshold) to determine the one or more ancestor versions of code and/or one or more descendant versions of code for which mergeability is to be assessed. For example, the version levels threshold is used to limit the set of versions of code having a dependency relationship with the first version of code to a subset thereof for which mergeability is to be assessed or enforced. As an example, the system uses the version levels threshold(s) to determine the subset for which mergeability is to be assessed from the set of versions of code having a dependency relationship with the first version of code returned by a querying of the dependency mapping.

In some embodiments, the version levels threshold(s) includes (i) a descendant level threshold pertaining to a threshold of a degree to which descendant versions of code (e.g., descendant versions of code) are to be considered, and/or (ii) an ancestor level threshold pertaining to a threshold of a degree to which ancestral versions of code (e.g., ancestor versions of code) are to be considered. The descendant level threshold may be equal to the ancestral level threshold, or the descendant level threshold and the ancestral level threshold may be different (e.g., the descendant level threshold and the ancestral level threshold may be separately configurable). In some embodiments, the system enforces/ ensure mergeability and/or merges a particular version of code with N ancestors, and M descendants, where N and M are respectively positive integers (which may be the same or different). For example, the system assesses mergeability with respect to N ancestors, and M descendants of the first version of code. As an example, a user such as a developer or administrator of first version of code can configure the version levels threshold via an interface provided at the corresponding administrator system or client system.

At 640, a mergeability of the first version of code with the ancestor and/or descendant version(s) of code is determined. In some embodiments, in response to determining the ancestor version(s) and/or descendant version(s) of code associated with the first version of code (e.g., the one or more ancestor versions of code and/or one or more descendant versions of code for which mergeability is to be assessed), the system determines a mergeability of the first version of code. As an example, the determining the mergeability of the first version of code includes determining whether a conflict is created/invoked (or expected to arise) in response to a merging of the first version of code and the ancestor version(s) and/or descendant version(s) of code. As another example, the system determines a first set of conflicts associated with merging the first version of code and a first ancestor version of code, a second set of conflicts associated with merging the first version of code and a second ancestor version of code, a third set of conflicts associated with merging the first version of code and a third ancestor version of code, a fourth set of conflicts associated with merging the first version of code and a first descendant version of code, set of conflicts associated with merging the first version of code and a second descendant version of code, and so on and so forth (e.g., for each of the other versions of code for which mergeability is to be assessed).

Figure 8:
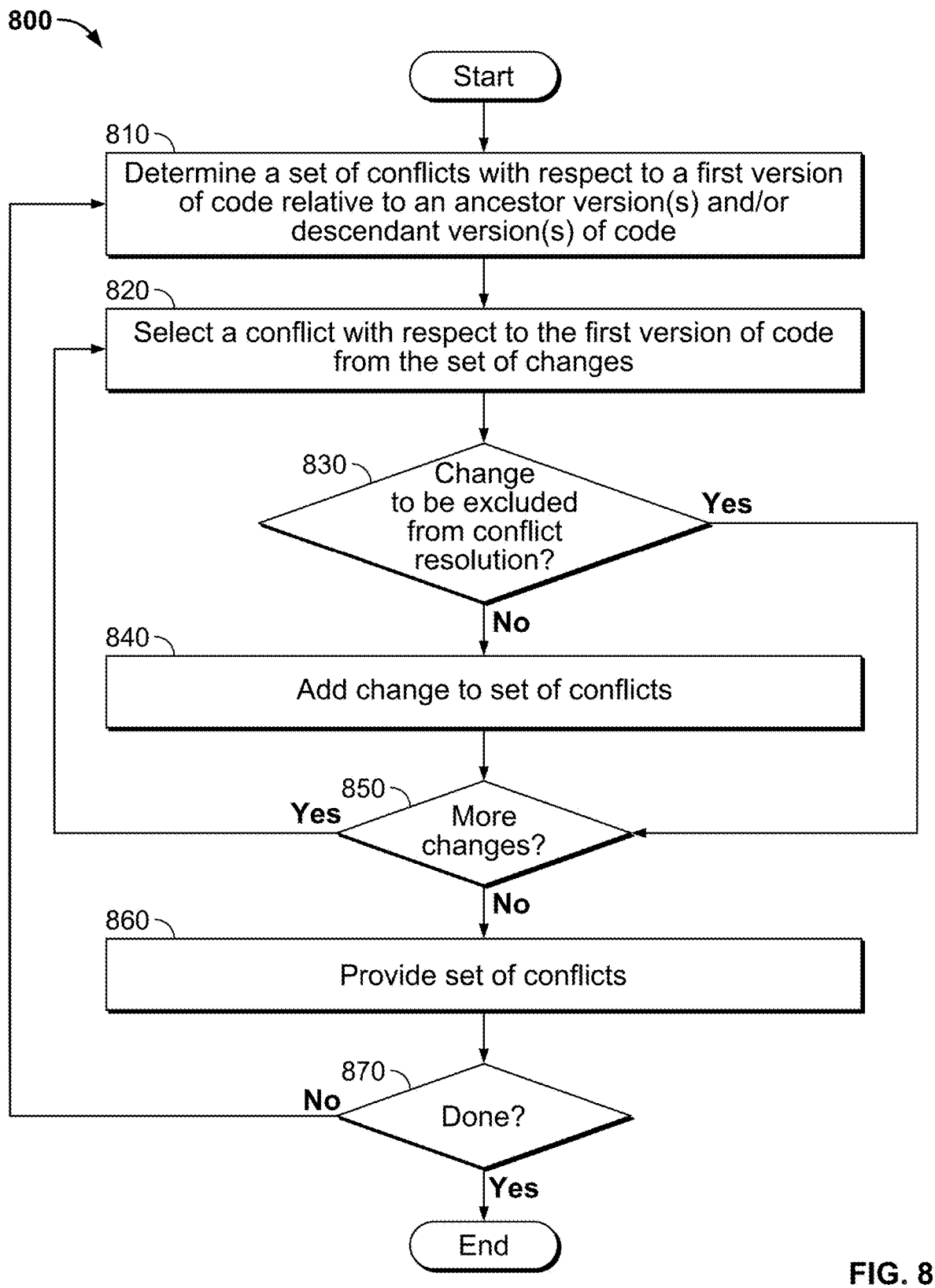
FIG. 8 is a flow diagram of a method for providing a set of conflicts for merging versions of code according to various embodiments of the present application.

In some embodiments, process 800 of FIG. 8 is invoked in connection with determining the mergeability of the first version of code with respect to the ancestor and/or descendant version(s) of code.

At 650, a determination is made as to whether the first version of code is mergeable with the ancestor and/or descendant version(s) of code. In some embodiments, the system determines whether the first version of code is mergeable with the ancestor and/or descendant version(s) of code based at least in part on a determination that no conflicts exist (e.g., are expected to rise) in response to a merging of the first version of code with the ancestor and/or descendant version(s) of code.

In response to determining that the first version of code is not mergeable with the ancestor and/or descendant version(s) of code at 650, process 600 proceeds to 660 at which mergeability conflicts between the first version of code and the ancestor and/or descendant version(s) of code are caused to be resolved. In some embodiments, causing the mergeability conflicts between the first version of code and the ancestor and/or descendant version(s) of code to be resolved comprises invoking process 900 of FIG. 9.

At 670, the first version of code and the ancestor and/or descendant version(s) of code are merged. In some embodiments, merging the first version of code and the ancestor and/or descendant version(s) of code comprises invoking process 700 of FIG. 7 and/or process 1000 of FIG. 10.

In response to determining that the first version of code is mergeable with the ancestor and/or descendant version(s) of code at 650, process 600 proceeds to 680 at which first version of code is merged with the ancestor and/or descendant version(s) of code. In some embodiments, merging the first version of code and the ancestor and/or descendant version(s) of code comprises invoking process 700 of FIG. 7 and/or process 1000 of FIG. 10.

At 690, a determination is made as to whether process 600 is complete. In some embodiments, process 600 is determined to be complete in response to a determination that the merging of versions of code is complete, that no further versions of code are to be merged, no further un-committed changes to a version of code exist, the user has exited the system, an administrator indicates that process 600 is to be paused or stopped, etc. In response to a determination that process 600 is complete, process 600 ends. In response to a determination that process 600 is not complete, process 600 returns to 610.

Figure 7:
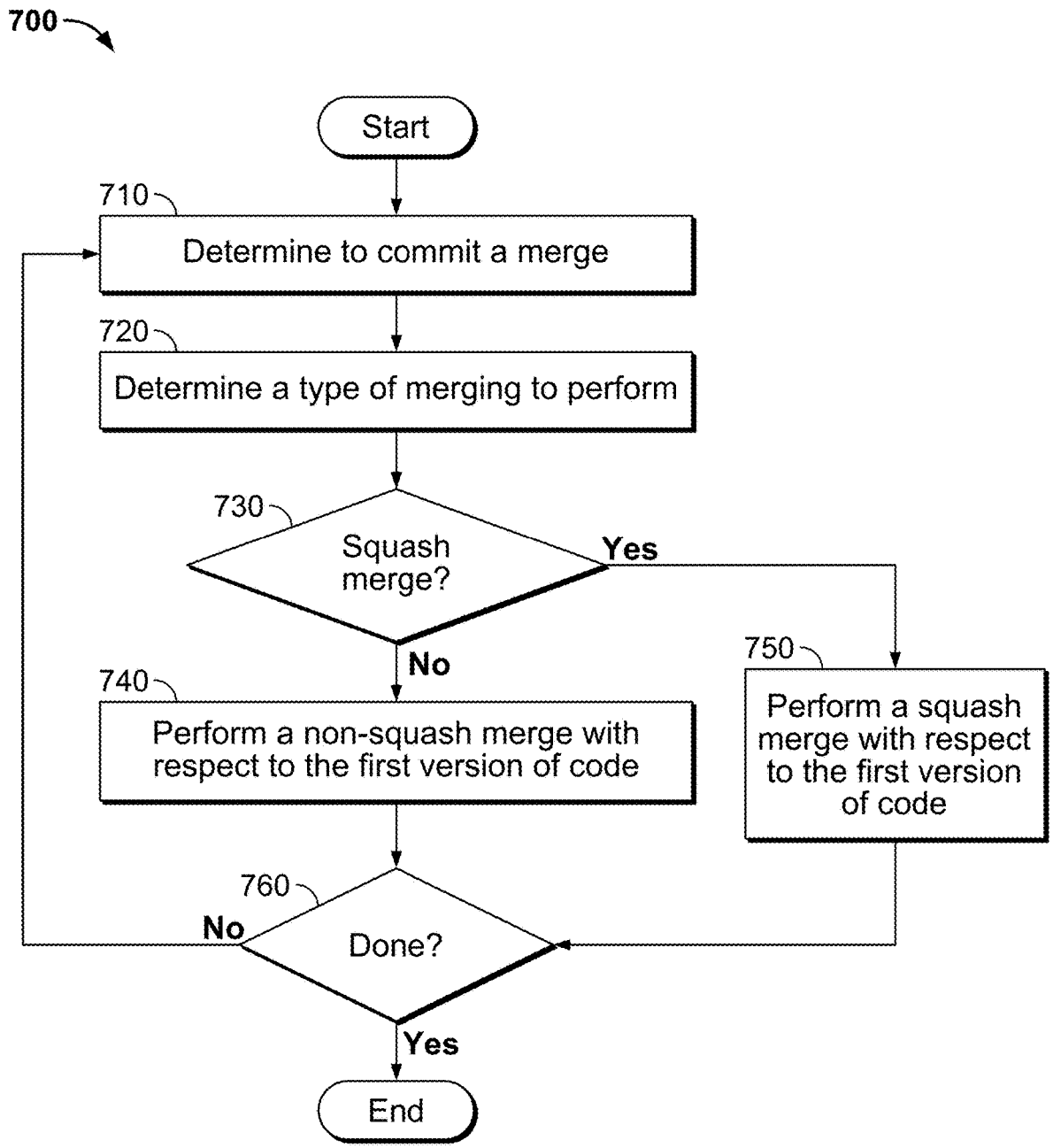
FIG. 7 is a flow diagram of a method for merging versions of code according to various embodiments of the present application.

FIG. 7 is a flow diagram of a method for merging versions of code according to various embodiments of the present application. According to various embodiments, process 700 is implemented at least in part by system 100 of FIG. 1 and/or system 200 of FIG. 2. In various embodiments, process 800 is implemented in connection with 540 of process 500 of FIG. 5, or 670 and/or 680 of process 600 of FIG. 6. For example, process 700 is invoked by 670 and/or 680 or process 600, or by 540 or process 500.

At 710, a determination is made to commit a merge. In some embodiments, the system determines to commit the merge based at least in part on a user selection to commit the merge, or push a release, etc. The system can determine to commit the merge in response to a determination that the set of conflicts (e.g., mergeability conflicts to be resolved, such as a subset of mergeability of conflicts not on a pre-stored exclusion list).

At 720, a type of merging to perform is determined. In response to determining to commit a merge, the system determines the type of merging is determined. For example, the system determines whether to perform a squash merge or a non-squash merge.

In some embodiments, the system determines the type of merge based at least in part on a number of changes or extent of modifications made to the version of code to be merges. In some embodiments, the system determines the type of merge based at least in part on whether a version of code to be merged comprises a particular type of change. Determination of a type of merge to be performed may be based at least in part on one or more of (or any combination thereof): (i) an indication provided by a system or user requesting the merge, (ii) an indication that the version of code is being committed in connection with pushing a release, (iii) a determination that a number of changes to be committed exceed a threshold number of changes, (iv) a determination that the set of changes to be committed include a particular type(s) of change, (v) a type of change, (vi) an indication that a user desires to maintain record of the commit for a particular set of one or more changes, etc. Various other factors may be used in connection with determining a type of merge to be performed.

At 730, a determination is made as to whether to the merge to perform is a squash merge.

In response to determining not to perform a squash merge at 730, process 700 proceeds to 740 at which a non-squash merge is performed with respect to the first version of code. In some embodiments, performing the non-squash merge includes committing a set of one or more modifications (e.g., modifications comprised in the first version of code, or a modification determined to be performed relative to another version of code based on a difference between the first version of code and the other version of code, etc.). In some embodiments, performing the non-squash merge comprises storing a record in a log (e.g., a log of commits performed in connection with a merge, etc.) with respect to at least a plurality of modifications of the set of one or more modifications. For example, the system stores a respective record for each of the modifications comprised in the set of one or more modifications. Performing the non-squash merge can include invoking process 1000 of FIG. 10.

In response to determining to perform a squash merge at 730, process 700 proceeds to 750 at which a squash merge is performed with respect to the first version of code. Performing the squash merge can include invoking process 1000 of FIG. 10. In some embodiments, performing the squash merge includes committing a plurality of modifications and storing a single record in the log (a log of commits performed in connection with a merge). As an example, if the set of modifications to commit comprises 3 modifications, a squash merge can include storing less than 3 records in the log. As another example, a plurality of modifications is committed and an aggregated record for a plurality of records is stored in connection with the plurality of modifications.

At 760, a determination is made as to whether process 700 is complete. In some embodiments, process 700 is determined to be complete in response to a determination that the merging of versions of code is complete, that no further versions of code are to be merged, the user has exited the system, an administrator indicates that process 700 is to be paused or stopped, etc. In response to a determination that process 700 is complete, process 700 ends. In response to a determination that process 700 is not complete, process 700 returns to 710.

FIG. 8 is a flow diagram of a method for providing a set of conflicts for merging versions of code according to various embodiments of the present application. According to various embodiments, process 800 is implemented at least in part by system 100 of FIG. 1 and/or system 200 of FIG. 2. In various embodiments, process 800 is implemented in connection with 540 of process 500 of FIG. 5, or 660 of process 600 of FIG. 6. For example, process 800 is invoked by 540 or process 500, or 660 of process 600.

At 810, a set of conflicts with respect to a first version of code relative to an ancestor version(s) and/or descendant version(s) of code is determined. In some embodiments, the system determines whether the first version of code conflicts with the one or more ancestor versions of code and one or more descendant versions of code based at least in part on determining differences between first version of code and the one or more ancestor versions of code and/or one or more descendant versions of code for which mergeability is to be assessed, and determining whether the differences would cause a set of conflicts if the first version of code was merged with the one or more ancestor versions of code and/or one or more descendant versions of code. Examples of a conflict include merge conflicts, inconsistencies in features, functions, libraries, etc.

At 820, a conflict with respect to the first version of code is selected from among a set of conflicts.

At 830, a determination is made as to whether the selected conflict is to be excluded from a conflict resolution. In some embodiments, the system determines whether a conflict is to be excluded from conflict resolution (e.g., as a pre-condition for the merging), based at least in part on an exclusion list.

In some embodiments, the system stores an exclusion list, or an exclusion mapping of versions or changes to indications of whether conflicts are to be excluded (or resolved), and the system uses the exclusion list or exclusion mapping in connection with merging the version of code and/or enforcing mergeability. As another example, the exclusion list corresponds to a list of changes for which the system is to merge with other versions of code (e.g., commit) regardless of whether a mergeability conflict exists (e.g., changes for which the system is to bypass a check of mergeability or whether conflicts exist). As another example, the exclusion list corresponds to a list of types of changes for which the system is to merge with other versions of code (e.g., commit) regardless of whether a mergeability conflict exists. In some embodiments, a list of types changes for which the system is to bypass a check of mergeability or whether conflicts exist. In some embodiments, the exclusion list is configurable, such as by an administrator of the organization for which the code is being merged/developed (e.g., a customer of the code development/merging service).

In response to a determination that the selected conflict is not to be excluded from the conflict resolution (e.g., as a pre-condition for merging) at 830, process 800 proceeds to 840 at which the selected change is added to a set of conflict checks. The set of conflicts can be a set of conflicts for which the system is to cause to be resolve (e.g., in connection with determining a mergeability of the first version of code and an ancestor version(s) and/or descendant version(s) of code). For example, the system determines whether merging the first version of code and an ancestor version(s) and/or descendant version(s) of code is expected to create a conflict. Thereafter, process 800 proceeds to 850.

In response to a determination that the selected conflict is to be excluded from the conflict check at 830, process 800 proceeds to 850.

At 850, a determination is made as to whether additional conflicts exist. For example, the system determines whether the set of conflicts with respect to the enforcement/ensuring of mergeability with respect to first version of code includes any further conflicts.

At 860, the set of conflicts is provided. In some embodiments, the set of conflict checks is provided to the system, such as in connection with the system determining whether the first version of code is mergeable with respect to the ancestor version(s) and/or descendant version(s) of code. For example, the system determines that the first version is not mergeable with respect to the ancestor and/or descendant version of code if the set of conflicts is non-zero. As another example, the system uses the set of conflicts in connection with causing the set of conflicts to be resolved (e.g., in connection with enforcing mergeability of the first version of code with respect to the ancestor version(s) and/or descendant version(s) of code).

At 870, a determination is made as to whether process 800 is complete. In some embodiments, process 800 is determined to be complete in response to a determination that the merging of versions of code is complete, that the set of conflicts has been resolved, that no further versions of code are to be merged, the user has exited the system, an administrator indicates that process 800 is to be paused or stopped, etc. In response to a determination that process 800 is complete, process 800 ends. In response to a determination that process 800 is not complete, process 800 returns to 810.

Although process 800 includes the system determining a set of conflicts expected to arise in connection with a merging, and thereafter determine a subset of conflicts to be resolved based on a determination of another subset of conflicts to be excluded (e.g., for which resolution is not a pre-condition for the merging, such as based on an exclusion list), the system can additionally, or alternatively, determining a set of changes and determining whether a change is to be excluded (e.g., based on an exclusion list) and thereafter determining a set of conflicts (e.g., conflicts between the first version of code and the corresponding ancestor version code or descendant version of code). As an example, the system determines the set of changes with respect to the first version of code based at least in part on metadata associated with the first version of code such as a log of modifications made to the first version of code since a last commit or since creation of the first version of code. As another example, the system determines the set of changes with respect to the first version of code based on a comparison between the first version of code and the corresponding ancestor version code or descendant version of code.

Figure 9:
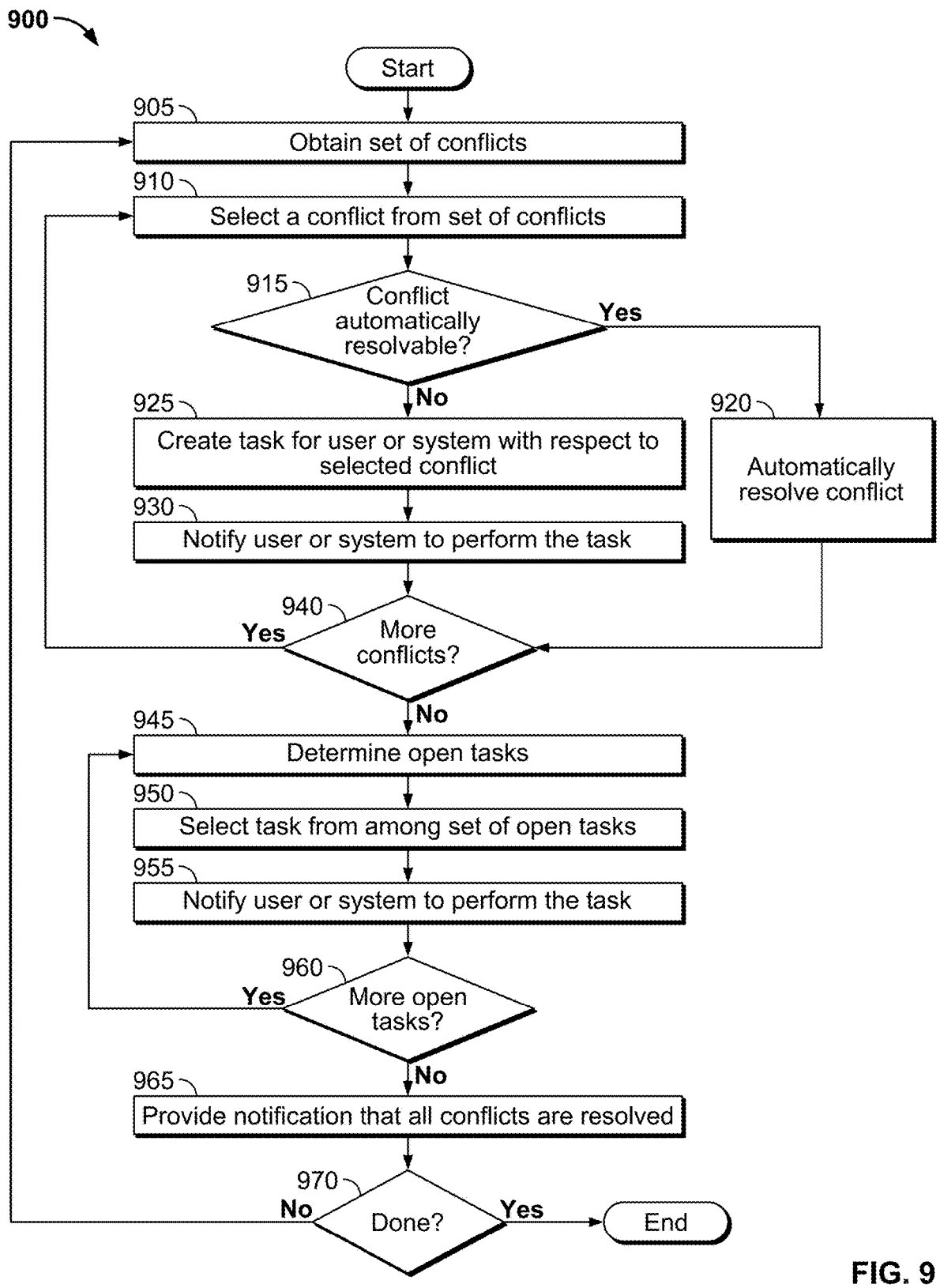
FIG. 9 is a flow diagram of a method for resolving conflicts associated with merging versions of code according to various embodiments of the present application.

FIG. 9 is a flow diagram of a method for resolving conflicts associated with merging versions of code according to various embodiments of the present application. According to various embodiments, process 900 is implemented at least in part by system 100 of FIG. 1 and/or system 200 of FIG. 2. In various embodiments, process 900 is implemented in connection with 530 of process 500 of FIG. 5, or 660 of process 600 of FIG. 6. For example, process 900 is invoked by 530 or process 500, or 660 of process 600.

At 905, a set of conflicts is obtained. In some embodiments, the set of conflicts is obtained in connection with process 800 of FIG. 8.

At 910, a conflict is selected from among the set of conflicts.

At 915, a determination is made as to whether the conflict (e.g., the selected conflict) is automatically resolvable. The system determines whether the conflict is automatically resolvable based at least in part on whether the system is able to resolve the conflict without manual intervention such as by a developer. The system can use a resolution model (e.g., a model developed using a machine learning process) in connection with determining whether the conflict is automatically resolvable. As an example, the system determines whether the system is able to predict one or more operations to be performed to resolve a conflict based at least in part on the model and/or historical information pertaining to resolutions of historical conflicts.

In some embodiments, the system stores list or mapping of conflicts (or types of conflicts) that are automatically resolvable, or a list of mapping of conflicts for which manual intervention is required.

In response to a determination that the conflict is automatically resolvable at 915, process 900 proceeds to 920 at which the conflict is automatically resolved. For example, the system performs one or more operations one or more operations that the system predicts will resolve the conflict. Thereafter, process 900 proceeds to 940.

In response to a determination that the conflict is not automatically resolvable at 915, process 900 proceeds to 925 at which a task for a user or system is created with respect to the selected conflict. At 930, the user or system is provided with a notification to perform the task.

In some embodiments, causing the set of conflicts to be resolved includes generating a task for a user to resolve (e.g., manually resolve) the conflict. The system communicates the task (or an indication of the task) to a user (e.g., a user associated with an administrator system or a client system). The task may be communicated via a communication application to which a code merging service connects (e.g., via an application programming interface (API)), such as Slack®, Microsoft Teams™, or via other issue tracking services such as Jira™, Confluence™, etc.

A user may manually modify one or more versions of code to resolve the conflict. For example, the user uses a client system to input a modification to the one or more versions of code. The system may monitor the version(s) of code for a modification or may otherwise receive the modification from the client system. In some embodiments, in response to the user manually modifying the one or more versions of code, the system assesses (e.g., automatically assesses) whether any conflicts remain (e.g., whether a particular conflict(s) is resolved), or specifically whether the conflict associated with the received modification was resolved.

At 940, a determination is made as to whether additional conflicts exist. For example, the system determines whether the set of conflicts include an additional conflict for which the system is to determine whether the conflict is automatically resolvable (or for which a task is to be assigned to a user/system).

In response to a determination that an additional conflict exists at 940, process 900 returns to 910 and process 900 iterates through 910-930 until no further conflicts exist (e.g., for which a determination of whether the conflict is automatically resolvable or whether manual intervention is to be caused/requested).

In response to a determination that no additional conflicts exist at 940, process 900 proceeds to 945 at which open tasks are determined. In some embodiments, the system monitors for resolution or completion of a task, and the system determines open tasks (e.g., unresolved tasks). The system can monitor the version(s) of code for a modification or may otherwise receive the modification from the client system. In some embodiments, in response to the user manually modifying the one or more versions of code, the system determines whether any conflicts remain, or specifically whether the conflict associated with the received modification was resolved.

At 950, a task is selected from among a set of open tasks.

At 955, the user or system is provided with a notification to perform the selected task. For example, the system provides the user/system with a reminder to perform the task. In some embodiments, the system provides the user/system with the reminder after a threshold period of time (e.g., a threshold period of time has elapsed since the user/system was first notified of the task, or since the user/system was last reminded to perform the task, or the later of either of the foregoing, etc.).

At 960, a determination is made as to whether additional (or any) open tasks exists.

In response to a determination that an open task(s) exists at 960, process 900 returns to 945 at which process iterates over 945-960 until no further open tasks exist.

In response to a determination that no open tasks exist at 960, process 900 proceeds to 965 at which a notification that all conflicts are resolved (or that no conflicts exist) is provided.

At 970, a determination is made as to whether process 900 is complete. In some embodiments, process 900 is determined to be complete in response to a determination that the merging of versions of code is complete, no further conflicts for the merge exist, that no further versions of code are to be merged, the user has exited the system, an administrator indicates that process 900 is to be paused or stopped, etc. In response to a determination that process 900 is complete, process 900 ends. In response to a determination that process 900 is not complete, process 900 returns to 905.

Figure 10:
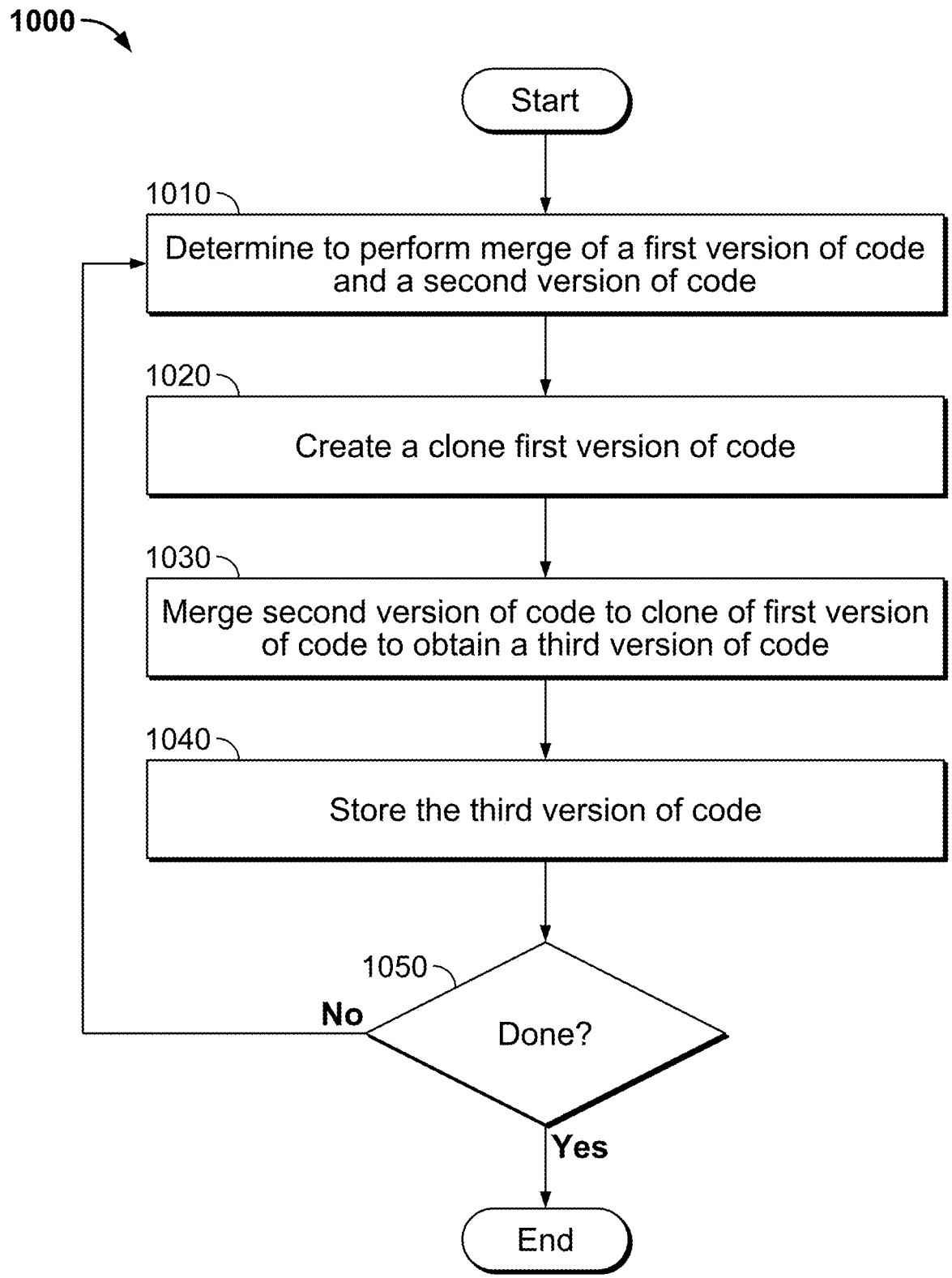
FIG. 10 is a flow diagram of a method for merging versions of code according to various embodiments of the present application.

FIG. 10 is a flow diagram of a method for merging versions of code according to various embodiments of the present application. According to various embodiments, process 1000 is implemented at least in part by system 100 of FIG. 1 and/or system 200 of FIG. 2. In various embodiments, process 1000 is implemented in connection with 540 of process 500 of FIG. 5, or 670 and/or 680 of process 600 of FIG. 6. For example, process 1000 is invoked by 540 or process 500, or 670 and/or 680 of process 600.

At 1010, a determination to perform a merge of a first version of code and at least a second version of code is made. At 1020, a clone of the first version of code is created. In some embodiments, creating the clone of the first version of code includes copying the first version of code. At 1030, at least the second version of code is merged to the clone of the first version of code to obtain a third version of code. At 1040, the third version of code is stored. The third version of code corresponds to a result of the merging of the first version of code and the second version of code.

At 1050, a determination is made as to whether process 1000 is complete. In some embodiments, process 1000 is determined to be complete in response to a determination that the merging of the first version of code and the second version of code is complete, that no further versions of code are to be merged, the user has exited the system, an administrator indicates that process 1000 is to be paused or stopped, etc. In response to a determination that process 1000 is complete, process 1000 ends. In response to a determination that process 1000 is not complete, process 1000 returns to 1010.

Various examples of embodiments described herein are described in connection with flow diagrams. Although the examples may include certain steps performed in a particular order, according to various embodiments, various steps may be performed in various orders and/or various steps may be combined into a single step or in parallel.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
   one or more processors; and
   a memory coupled to the one or more processors and containing instructions, which, when executed, cause the one or more processors to:
   obtain a first version of a code;
   determine that the first version of the code creates a first conflict with respect to an ancestor version of the code, wherein the ancestor version of the code comprises a set of code that has a dependency relationship on another version of the code;
   determine whether the first conflict is to be resolved based at least in part on an exclusion list;
   merge the ancestor version of the code with a clone of the first version of the code to obtain a third version of the code; and
   store the third version of the code.

2. The system of claim 1, wherein the ancestor version of the code is one of a plurality of ancestor versions of the code and determining whether the first version of the code creates the first conflict with respect to the ancestor version of the code of the plurality of ancestor versions of the code is part of determining a set of conflicts comprising:
   selecting the ancestor version of the code from the plurality of ancestor versions of the code; and
   determining, for each of the plurality of ancestor versions of the code, whether one of a set of conflicts is created based at least in part on merging the first version of the code with a corresponding one of the plurality of ancestor versions of the code.

3. The system of claim 1, wherein the one or more processors are further configured to:
   determine whether a merging of the first version of the code with respect to at least descendant version of the code creates a second conflict; and
   in response to determining that a second conflict is created, cause the second conflict to be resolved.

4. The system of claim 3, wherein the determining whether the merging of the first version of the code with respect to at least one descendant version of code creates the second conflict comprises:
   selecting a plurality of descendant versions of the code; and
   determining, for each of the plurality of descendant versions of the code, whether a second conflict is created based at least in part on merging the first version of the code with at least one of the plurality of descendant versions of the code.

5. The system of claim 4, wherein the ancestor version of the code or the at least one descendant version of code is determined based at least in part on a mapping of ancestor and/or descendant branches of the code.

6. The system of claim 5, wherein the one or more processors are further configured to:
update the mapping of ancestor and/or descendant branches of the code in response to a determination that a new version of the code being created.

7. The system of claim 1, wherein the one or more processors are further configured to:
in response to determining that the first conflict is resolved, commit the first version of the code.

8. The system of claim 7, wherein committing the first version comprises:
merging a difference between the first version of the code and the ancestor version of the code to the ancestor version of the code; and
merging the difference between the first version of the code and at least one descendant version of the code to the at least one descendant version of the code.

9. The system of claim 1, wherein:
the first conflict corresponds to the first version of the code being out of sync with the ancestor version of the code if a difference between the first version of the code and the ancestor version of the code is committed to the ancestor version of the code.

10. The system of claim 1, wherein causing the first conflict to be resolved comprises:
generating one or more tasks for one or more users associated with the system;
communicating, to one or more client devices associated with the one or more users, an indication of the one or more tasks; and
ensuring that the first version of the code is not committed until the first conflict is resolved by the one or more users.

11. The system of claim 10, wherein the first version of the code is automatically committed in response to a determination that the first conflict is resolved.

12. The system of claim 10, wherein the causing the first conflict to be resolved further comprises:
monitoring completion of the one or more tasks.

13. The system of claim 1, wherein the one or more processors are further configured to:
in response to determining that the first conflict is resolved, commit the first version of the code, wherein committing the first version of the code comprises:
determining a set of modifications comprised in the first version of the code; and
propagating the set of modifications to the ancestor version of the code.

14. The system of claim 13, wherein committing the first version of the code further comprises propagating the set of modifications to a parallel version of the code.

15. The system of claim 13, wherein the set of modifications is propagated to a predetermined number of generations of ancestor versions of the code.

16. The system of claim 15, wherein the predetermined number of generations is equal to or less than 3.

17. The system of claim 1, wherein the exclusion list comprises an indication of a set of files for which changes are committed regardless of whether one or more mergeability conflicts exist with the ancestor version of the code.

18. The system of claim 17, wherein the one or more processors are further configured to:
in response to obtaining the first version of the code, determine whether the first version of the code corresponds to a file in the set of files; and
in response to a determination that the first version of code corresponds to the file in the set of files, determine to commit the first version of the code.

19. The system of claim 1, wherein the one or more processors are further configured to:
in response to determining that the first conflict is resolved, commit the first version of the code, wherein committing the first version of the code comprises:
performing a non-squash merge of the first version of the code is performed with respect to any descendant versions of the code.

20. The system of claim 1, wherein the one or more processors are further configured to in response to a determination that the first conflict is to be resolved, cause the first conflict to be resolved prior to the merging of the ancestor version of the code with the clone of the first version of the code.

21. The system of claim 1, wherein the one or more processors are further configured to determine a likelihood that one or more operations will resolve the first conflict.

22. The system of claim 21, wherein the one or more processors are further configured to in response to a determination that the likelihood is above the predetermined threshold, automatically perform the one or more operations.

23. The system of claim 21, wherein the one or more processors are further configured to in response to a determination that the likelihood is not above the predetermined threshold, provide a prompt to a user.

24. The system of claim 23, wherein the prompt prompts the user to confirm that the one or more operations are to be performed, to select from a set of recommended operations to be performed, to manually perform the one or more operations, and/or to manually perform a task.

25. A method, comprising:
obtaining, by one or more processors, a first version of a code;
determining that the first version of the code creates a first conflict with respect to an ancestor version of the code, wherein the ancestor version of the code comprises a set of code that has a dependency relationship on another version of the code;
determining whether the first conflict is to be resolved based at least in part on an exclusion list;
merging the ancestor version of the code with a clone of the first version of the code to obtain a third version of the code; and
storing the third version of the code.

26. A non-transitory computer readable medium containing computer instructions which, when executed, cause a processor to perform:
obtaining a first version of a code;
determining that the first version of the code creates a first conflict with respect to an ancestor version of the code, wherein the ancestor version of the code comprises a set of code that has a dependency relationship on another version of the code;
determining whether the first conflict is to be resolved based at least in part on an exclusion list;

merging the ancestor version of the code with a clone of the first version of the code to obtain a third version of the code; and storing the third version of the code.

\* \* \* \* \*